(12) United States Patent
Stockmann et al.

(10) Patent No.: US 12,445,302 B2
(45) Date of Patent: Oct. 14, 2025

(54) CALLER PROCESS VERIFICATION FOR DEVICE-BOUND AUTHENTICATORS

(71) Applicant: Okta, Inc., San Francisco, CA (US)

(72) Inventors: Johannes Stockmann, Woodinville, WA (US); Stephen Woodward Lind, El Cerrito, CA (US)

(*) Notice: Subject to any disclaimer, the term of this patent is extended or adjusted under 35 U.S.C. 154(b) by 273 days.

(21) Appl. No.: 18/309,383

(22) Filed: Apr. 28, 2023

(65) Prior Publication Data

US 2024/0364535 A1 Oct. 31, 2024

(51) Int. Cl.
*H04L 9/32* (2006.01)
*H04L 9/08* (2006.01)

(52) U.S. Cl.
CPC .......... *H04L 9/3247* (2013.01); *H04L 9/0825* (2013.01); *H04L 9/3271* (2013.01)

(58) Field of Classification Search
CPC .................................................... H04L 9/3247
See application file for complete search history.

(56) References Cited

U.S. PATENT DOCUMENTS

| 2016/0277930 | A1* | 9/2016 | Li | H04L 41/28 |
| 2018/0316665 | A1* | 11/2018 | Caldera | H04L 63/104 |
| 2020/0274859 | A1* | 8/2020 | Melo | H04L 9/0897 |
| 2021/0051027 | A1* | 2/2021 | Wang | H04L 9/3239 |

* cited by examiner

*Primary Examiner* — Bradley W Holder
(74) *Attorney, Agent, or Firm* — Holland & Hart LLP

(57) ABSTRACT

Methods, systems, and devices for process verification are described. An authenticator application of a device may receive, from an authenticating application of the device, a first request to establish a network connection between the authenticator application and the authenticating application. The first request may identify a port associated with the network connection. The authenticator application may receive a second request from the authenticating application to authenticate an identity of a user. The authenticator application may identify a process used to establish the network connection between the authenticator application and the authenticating application on the port. The authenticator application may obtain a signature and a set of data associated with the signature based on the identified process. The authenticator application may authenticate the identity of the user based on the signature and the associated set of data.

14 Claims, 9 Drawing Sheets

CALLER PROCESS VERIFICATION FOR DEVICE-BOUND AUTHENTICATORS

FIELD OF TECHNOLOGY

The present disclosure relates generally to database systems and data processing, and more specifically to caller process verification for device-bound authenticators.

BACKGROUND

A software application may request that a user log into an account using authenticators, such as a combination of a username and a password. Users who have accounts for several different applications may therefore maintain several different authenticators. The necessity of separately logging in to each application may impose a considerable burden on a user, who may use a different authenticator for each application. In some cases, a user may employ an identity provider (IDP) to help manage identifying information associated with the user, such that the user may access applications via the IDP rather than separately logging in to each application. That is, the user may request to log into the IDP to gain access to multiple applications. To grant a user access to an application, the IDP may request that the application authenticate the identity of the user via an authenticator application associated with the IDP. As such, the authenticator application may manage user identity authentication requests from multiple applications. In some use cases, however, conventional techniques for manage user identity authentication requests may be deficient or sub-optimal in some current configurations.

SUMMARY

The described techniques relate to improved methods, systems, devices, and apparatuses that support caller process verification for device-bound authenticators. For example, an authenticator application of a device may receive, from an authenticating application of the device, a first request to establish a network connection between the authenticator application and the authenticating application. The first request may identify a port associated with the network connection. The authenticator application may receive a second request from the authenticating application to authenticate an identity of a user. The authenticator application may identify a process used to establish the network connection between the authenticator application and the authenticating application on the port. The authenticator application may obtain a signature and a set of data associated with the signature based on the identified process. The authenticator application may authenticate the identity of the user based on the signature and the associated set of data.

A method for process verification at a first application of a device is described. The method may include receiving, from a second application of the device, a first request to establish a network connection between the first application and the second application, where the first request identifies a port associated with the network connection, receiving, from the second application via the network connection, a second request to authenticate an identity of a user of the second application via the first application, identifying, in response to the second request, a process used to establish the network connection between the first application and the second application based on the port, and obtaining a signature and a set of data associated with the signature based on the identified process, where authenticating the identity of the user is based on the signature and the associated set of data.

An apparatus for process verification at a first application of a device is described. The apparatus may include a processor, memory coupled with the processor, and instructions stored in the memory. The instructions may be executable by the processor to cause the apparatus to receive, from a second application of the device, a first request to establish a network connection between the first application and the second application, where the first request identifies a port associated with the network connection, receive, from the second application via the network connection, a second request to authenticate an identity of a user of the second application via the first application, identify, in response to the second request, a process used to establish the network connection between the first application and the second application based on the port, and obtain a signature and a set of data associated with the signature based on the identified process, where authenticating the identity of the user is based on the signature and the associated set of data.

Another apparatus for process verification at a first application of a device is described. The apparatus may include means for receiving, from a second application of the device, a first request to establish a network connection between the first application and the second application, where the first request identifies a port associated with the network connection, means for receiving, from the second application via the network connection, a second request to authenticate an identity of a user of the second application via the first application, means for identifying, in response to the second request, a process used to establish the network connection between the first application and the second application based on the port, and means for obtaining a signature and a set of data associated with the signature based on the identified process, where authenticating the identity of the user is based on the signature and the associated set of data.

A non-transitory computer-readable medium storing code for process verification at a first application of a device is described. The code may include instructions executable by a processor to receive, from a second application of the device, a first request to establish a network connection between the first application and the second application, where the first request identifies a port associated with the network connection, receive, from the second application via the network connection, a second request to authenticate an identity of a user of the second application via the first application, identify, in response to the second request, a process used to establish the network connection between the first application and the second application based on the port, and obtain a signature and a set of data associated with the signature based on the identified process, where authenticating the identity of the user is based on the signature and the associated set of data.

Some examples of the method, apparatuses, and non-transitory computer-readable medium described herein may further include operations, features, means, or instructions for determining, based on the set of data, whether the second application may be authorized for requesting authentication of the identity of the user via the first application and authenticating the identity of the user based on the determination.

Some examples of the method, apparatuses, and non-transitory computer-readable medium described herein may further include operations, features, means, or instructions for identifying a source of the second application based on the set of data, where determining whether the second application may be authorized for requesting authentication of the identity of the user may be based on the identified source.

Some examples of the method, apparatuses, and non-transitory computer-readable medium described herein may further include operations, features, means, or instructions for determining a level of legitimacy of the second application based on the identified source, where determining whether the second application may be authorized for requesting authentication of the identity of the user may be based on the determined level of legitimacy.

Some examples of the method, apparatuses, and non-transitory computer-readable medium described herein may further include operations, features, means, or instructions for determining an association between the identified source and a set of authorized sources or a set of unauthorized sources, where determining whether the second application may be authorized for requesting authentication of the identity of the user may be based on the determined association.

Some examples of the method, apparatuses, and non-transitory computer-readable medium described herein may further include operations, features, means, or instructions for receiving an indication of a configuration for authenticating the identity of the user, where determining whether the second application may be authorized for requesting authentication of the identity of the user may be based on the configuration.

In some examples of the method, apparatuses, and non-transitory computer-readable medium described herein, receiving the second request may include operations, features, means, or instructions for receiving, from the second application via the network connection, a message including the indication of the configuration and an indication of the second request, where the second request includes an authentication challenge, and where the configuration and the authentication challenge originated from an authentication service associated with the user.

Some examples of the method, apparatuses, and non-transitory computer-readable medium described herein may further include operations, features, means, or instructions for verifying a signature of the message based on a public key associated with the authentication service, where use of the configuration to determine whether the second application may be authorized for requesting authentication of the identity of the user may be based on verifying the signature.

In some examples of the method, apparatuses, and non-transitory computer-readable medium described herein, the set of data includes one or more types of data and the one or more types of data may be based on the configuration.

Some examples of the method, apparatuses, and non-transitory computer-readable medium described herein may further include operations, features, means, or instructions for transmitting, to an authentication service associated with the user, a message including an indication of the set of data, where authenticating the identity of the user may be based on transmitting the message to the authentication service.

In some examples of the method, apparatuses, and non-transitory computer-readable medium described herein, the second request includes an authentication challenge originating from the authentication service and the message includes the indication of the set of data and a response to the authentication challenge.

In some examples of the method, apparatuses, and non-transitory computer-readable medium described herein, obtaining the set of data may include operations, features, means, or instructions for obtaining the set of data from an operating system of the device, an authentication service associated with the user, or a third-party application, or any combination thereof.

In some examples of the method, apparatuses, and non-transitory computer-readable medium described herein, obtaining the set of data may include operations, features, means, or instructions for obtaining data indicative of a location of code associated with the second application, data indicative of a name of the second application, data indicative of a name of a file including the code associated with the second application, data indicative of a process identifier corresponding to the process, data indicative of a version associated with the second application, data indicative of a level of integrity associated with the signature, data indicative of a validation status associated with a certificate chain of the signature, data indicative of a distinguished name corresponding to the signature, data indicative of a key identifier corresponding to the signature, or any combination thereof.

A method for process verification at an authentication service of a first device is described. The method may include receiving, from a first application of a second device, a first request to authorize access to a resource by a user of the first application, transmitting, to the first application in response to the first request, a second request to authenticate an identity of the user via a second application of the second device, and receiving, from the second application in response to the second request, a set of data associated with a signature of the first application, where authorizing access to the resource is based on the set of data.

An apparatus for process verification at an authentication service of a first device is described. The apparatus may include a processor, memory coupled with the processor, and instructions stored in the memory. The instructions may be executable by the processor to cause the apparatus to receive, from a first application of a second device, a first request to authorize access to a resource by a user of the first application, transmit, to the first application in response to the first request, a second request to authenticate an identity of the user via a second application of the second device, and receive, from the second application in response to the second request, a set of data associated with a signature of the first application, where authorizing access to the resource is based on the set of data.

Another apparatus for process verification at an authentication service of a first device is described. The apparatus may include means for receiving, from a first application of a second device, a first request to authorize access to a resource by a user of the first application, means for transmitting, to the first application in response to the first request, a second request to authenticate an identity of the user via a second application of the second device, and means for receiving, from the second application in response to the second request, a set of data associated with a signature of the first application, where authorizing access to the resource is based on the set of data.

A non-transitory computer-readable medium storing code for process verification at an authentication service of a first device is described. The code may include instructions executable by a processor to receive, from a first application of a second device, a first request to authorize access to a resource by a user of the first application, transmit, to the first application in response to the first request, a second request to authenticate an identity of the user via a second application of the second device, and receive, from the second application in response to the second request, a set of data associated with a signature of the first application, where authorizing access to the resource is based on the set of data.

Some examples of the method, apparatuses, and non-transitory computer-readable medium described herein may further include operations, features, means, or instructions for determining, based on the set of data, whether the first application may be authorized for requesting authentication of the identity of the user via the second application and authorizing access to the resource based on the determination.

Some examples of the method, apparatuses, and non-transitory computer-readable medium described herein may further include operations, features, means, or instructions for determining a configuration for authenticating the identity of the user, where determining whether the first application may be authorized for requesting authentication of the identity of the user via the second application may be based on the configuration.

Some examples of the method, apparatuses, and non-transitory computer-readable medium described herein may further include operations, features, means, or instructions for receiving, from a third device associated with an organization of the user, a message including an indication of the configuration or one or more parameters associated with the configuration, where determining the configuration may be based on the message.

Some examples of the method, apparatuses, and non-transitory computer-readable medium described herein may further include operations, features, means, or instructions for transmitting, to the third device, a recommendation for the configuration based on historical access request associated with the first application, where the indication of the configuration may be based on the recommendation.

Some examples of the method, apparatuses, and non-transitory computer-readable medium described herein may further include operations, features, means, or instructions for storing data associated with the first request, where the stored data includes the set of data or data indicative of an action performed by the first application in response to authorizing access to the resource, or both.

In some examples of the method, apparatuses, and non-transitory computer-readable medium described herein, the set of data includes one or more types of data and the one or more types of data may be based on the configuration.

Some examples of the method, apparatuses, and non-transitory computer-readable medium described herein may further include operations, features, means, or instructions for identifying a source of the first application based on the set of data, where determining whether the first application may be authorized for requesting authentication of the identity of the user may be based on the identified source.

Some examples of the method, apparatuses, and non-transitory computer-readable medium described herein may further include operations, features, means, or instructions for determining a level of legitimacy of the first application based on the identified source, where determining whether the first application may be authorized for requesting authentication of the identity of the user may be based on the determined level of legitimacy.

Some examples of the method, apparatuses, and non-transitory computer-readable medium described herein may further include operations, features, means, or instructions for determining an association between the identified source and a set of authorized sources or a set of unauthorized sources, where determining whether the first application may be authorized for requesting authentication of the identity of the user may be based on the determined association.

In some examples of the method, apparatuses, and non-transitory computer-readable medium described herein, the second request includes an authentication challenge.

In some examples of the method, apparatuses, and non-transitory computer-readable medium described herein, the set of data may be obtained from an operating system of the second device, the authentication service, or a third-party application, or any combination thereof.

In some examples of the method, apparatuses, and non-transitory computer-readable medium described herein, the set of data includes data indicative of a location of code with the first application, data indicative of a name of the first application, data indicative of a name of a file including the code associated with the first application, data indicative of a process used to establish a network connection between the first application and the second application, data indicative of a version associated with the first application, data indicative of a level of integrity associated with the signature, data indicative of a validation status associated with a certificate chain of the signature, data indicative of a distinguished name corresponding to the signature, data indicative of a key identifier corresponding to the signature, or any combination thereof.

DETAILED DESCRIPTION

Figure 1:
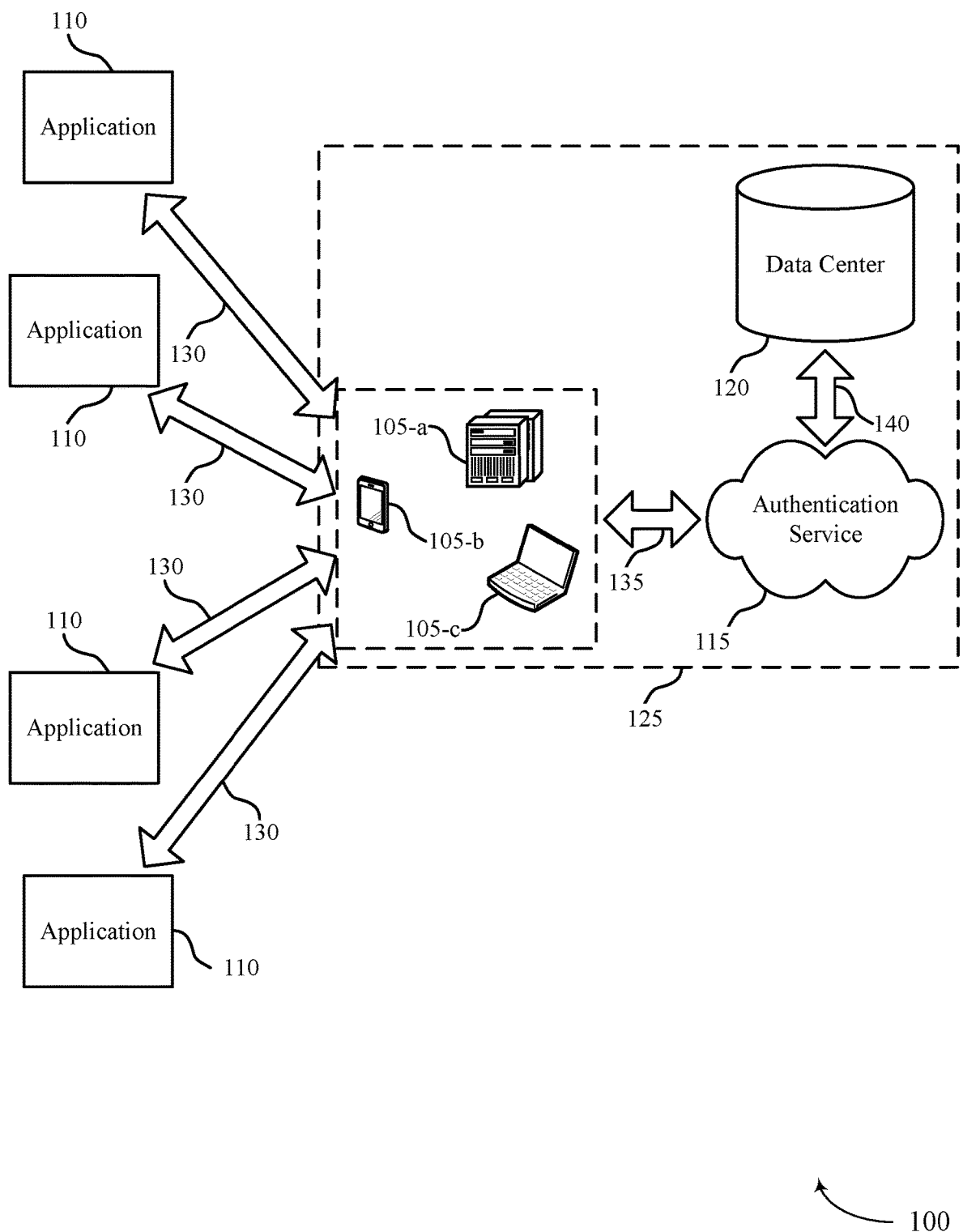
FIGS. 1 and 2 each illustrate an example of a process verification system that supports caller process verification for device-bound authenticators in accordance with aspects of the present disclosure.

Some organizations may use an authentication service to manage identifying information associated with users of the organizations. In some examples, such authentication services may be referred to as identity provider (IDPs) or authentication platforms. For example, an IDP may be an authentication platform (e.g., a software platform, a service) that stores and manages digital identities of users. In some examples, an organization may use an IDP to manage access to resources associated with the organization. In such examples, a user of the organization may use the IDP to manage identifying information associated with the user, such that the user may access the resources. For example, the IDP may manage log in requests from the user, verify authenticators used for the login requests, and authorize access to resources associated with the request. In some examples, the user may request to log into the IDP to gain access to an application (e.g., a resource). In such an example, as part of the login process, the application may transmit a request to the IDP to grant access by the user to the application. To grant the user access to the application, the IDP may request that the application authenticate the identity of the user via an authenticator application associated with the IDP. As such, the application may forward the authentication request to the authenticator application. As described herein, applications requesting authentication of user identities may be referred to as authenticating applications. The authenticator application may be an example of a device-bound authenticator. That is, the authenticator application may be located on a same device as the application to which access is being request. In such an example, the authenticator application may provide a key to the IDP that may attest to the identity of the user, such that the user may access the application. In some examples, the key may be stored on the client device and, as such, may not be extracted from the client device and transferred to another device for authenticating the identity of the user. As such, the authenticator application may provide an increased level of assurance associated with user identity authentication. In some examples, a coupling between the authenticating application and the authenticator application may be relatively loose and enable integrations without control over the authenticating application (or other authenticating applications). In some examples, however, such loose coupling may lead the authenticator application to be susceptible to attack vectors. For example, relatively loose coupling may enable malicious actors to inject themselves into a communication flow between the authenticating application and the authenticator application, such that the malicious actor may invoke the authenticator application.

Various aspects of the present disclosure may provide a framework for the authenticator application or the IDP (or both) to establish an authenticity and a signature chain of a calling process for the authenticating application. For example, the authenticating application may transmit a first request to the authenticator application to establish a network connection between the authenticating application and the authenticator application. In such an example, the authenticator application may identify a calling process used to establish the network connection. For example, the first request may identify a port used establish the network connection. In such an example, the port may be associated with a process identifier (ID) corresponding to the calling process for the authenticating application. The authenticator application may use the process ID to identify the calling process. In other words, the authenticator application may use the process ID to identify the source of the authenticating application (e.g., an authenticating binary that belongs to the process ID). Additionally, the authenticator application may obtain a signature of the source and metadata associated with the signature. The authenticator application (or the authentication service) may use the signature or the associated metadata (or both) to verify that the source, and therefore the authenticating application, is authorized to request authentication of the identity of the user via the authenticator application. For example, the authenticator application may obtain a configuration (e.g., from the authentication service) that may indicate whether the source authorized to request authentication of the identity of the user via the authenticator application based on the signature and associated metadata. Additionally, or alternatively, the authenticator application may forward the signature and the associated metadata to the IDP, such that the IDP may use the signature and the associated metadata (e.g., in accordance with the configuration) to verify that the source is authorized to request authentication of the identity of the user via the authenticator application.

In some examples, by verifying that the source is authorized to request authentication of the identity of the user via the authenticator application, the authenticator application or the authentication service (or both) may increase security for the organization, among other benefits. Aspects of the disclosure are initially described in the context of systems for distributed computing and process flows. Aspects of the disclosure are further illustrated by and described with reference to apparatus diagrams, system diagrams, and flowcharts that relate to caller process verification for device-bound authenticators.

FIG. 1 illustrates an example of a system 100 for distributed computing (e.g., cloud computing) that supports techniques for dynamically adjusting authenticator assurance levels in accordance with various aspects of the present disclosure. The system 100 includes client devices 105, applications 110, authentication service 115, and data storage 120. The authentication service 115 (e.g., an IDP) may be an example of a public or private cloud network. A client device 105 may access authentication service 115 over network connection 135. The network may implement transmission control protocol and internet protocol (TCP/IP), such as the Internet, or may implement other network protocols. A client device 105 may be an example of a user device, such as a server (e.g., client device 105-*a*), a smartphone (e.g., client device 105-*b*), or a laptop (e.g., client device 105-*c*). In other examples, a client device 105 may be a desktop computer, a tablet, or another computing device or system capable of generating, analyzing, transmitting, or receiving communications. In some examples, a client device 105 may be operated by a user that is part of a business, an enterprise, a non-profit, a startup, or any other company type (e.g., organization type).

A client device 105 may interact with multiple applications 110 using one or more interactions 130. The interactions 130 may include digital communications, application programming interface (API) calls, hypertext transfer protocol (HTTP) messages, or any other interaction between a client device 105 and an application 110. Data may be associated with the interactions 130. A client device 105 may access authentication service 115 to store, manage, and process the data associated with the interactions 130. In some examples, the client device 105 may have an associated security or permission level. A client device 105 may have access to some applications, data, and database information within authentication service 115 based on the associated security or permission level, and may not have access to others.

Applications 110 may interact with the client device 105 via email, web, text messages, or any other suitable form of interaction. The interaction 130 may be a business-to-business (B2B) interaction or a business-to-consumer (B2C) interaction. An application 110 may also be referred to as a customer, a client, a website, or some other suitable terminology. In some examples, the application 110 may be an example of a server, a node, a computer cluster, or any other type of computing system, component, or environment. In some examples, the application 110 may be operated by a user or a group of users.

Authentication service 115 may offer cloud-based services to the client devices 105, the applications 110, or both. In some examples, the authentication service 115 may support a database system such as a multi-tenant database system. In such cases, authentication service 115 may serve multiple client devices 105 with a single instance of software. However, other types of systems may be implemented, including—but not limited to—client-server systems, mobile device systems, and mobile network systems. Authentication service 115 may receive data associated with interactions 130 from the client device 105 over network connection 135, and may store and analyze the data. In some examples, authentication service 115 may receive data directly from an interaction 130 between an application 110 and the client device 105. In some examples, the client device 105 may develop applications to run on authentication service 115. Authentication service 115 may be implemented using remote servers. In some examples, the remote servers may be examples of data storage 120.

Data storage 120 may include multiple servers. The multiple servers may be used for data storage, management, and processing. Data storage 120 may receive data from authentication service 115 via connection 140, or directly from the client device 105 or an interaction 130 between an application 110 and the client device 105. Data storage 120 may utilize multiple redundancies for security purposes. In some examples, the data stored at data storage 120 may be backed up by copies of the data at multiple locations.

Subsystem 125 may include client devices 105, authentication service 115, and data storage 120. In some examples, data processing may occur at any of the components of subsystem 125 (e.g., a software platform, a cloud platform, an authentication platform), or at a combination of these components. In some examples, servers may perform the data processing. The servers may be a client device 105 or located at data storage 120.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

In some examples, the applications 110 may request that users (e.g., via one or more of the client devices 105) log in to an account using the subsystem 125. The subsystem 125 may be an example of a software platform for authentication (e.g., an authentication platform including an authentication service 115). For example, the authentication service 115 (e.g., an IDP) may receive an access request from a first application 110 to authorize access to the application 110 by a user of a client device 105. In response, the authentication service 115 may transmit an authentication request to the first application 110 to authenticate an identity of the user via a second application 110. The first application 110 may establish a network connection with the second application 110, such that the first application 110 may forward the authentication request to the second application 110. In some examples, however, a coupling between the first application 110 and the second application 110 may be relatively loose, such that an attacker may inject themselves into a flow of communication between the first application 110 and the second application 110 and may acquire the authentication request.

To mitigate attacks from the attacker, the second application 110 may employ one or more techniques for caller process verification for device-bound authenticators, as described herein. For example, the second application 110 may perform one or more steps to establish an authenticity and a signature chain of a calling process for the first application 110, for example, while the network connection between the first application 110 and the second application 110 is established. The second application 110 may use a port associated with the network connection to identify a caller process use to establish the network connection. The second application 110 may then use verify whether the identified calling process is authorized to request authentication of the identity of the user via the second application 110. For example, the second application 110 may identify an authenticating binary associated with the calling process (e.g., a source of the first application 110) and determine whether the authenticating binary is signed. In some examples, such as examples in which the identified authenticating binary is signed, the second application may determine whether a trust chain of the signature may be validated.

The second application 110 may verify the identity of the user and transmit an authentication response to the authentication service 115. The authentication response may be responsive to the authentication request and may indicate data that may identify the calling binary and the chain of trust of the signature. For example, the authentication response may indicate the signature, the signature validation result, and metadata associated with the signature. The authentication service 115 may use the indicated data to make decisions on, for example, whether to authorize access to the first application 110 by the user or whether the first application 110 is authorized to request authentication of the identity of the user via the second application 110, or both. In some examples, enabling the second application 110 to establish an authenticity and signature chain of the calling process for the first application 110 may lead to increased security for the organization, among other benefits.

It should be appreciated by a person skilled in the art that one or more aspects of the disclosure may be implemented in a system 100 to additionally, or alternatively, solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
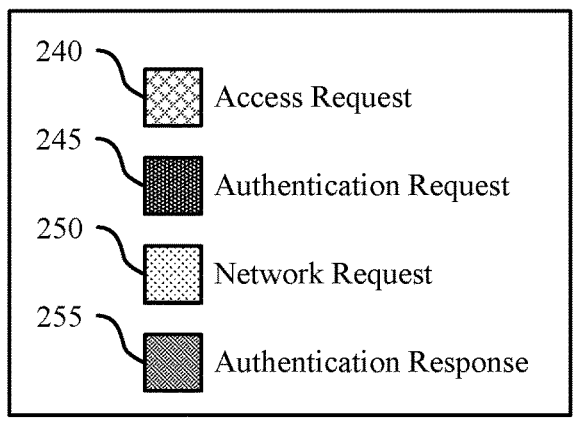
Figure 2:
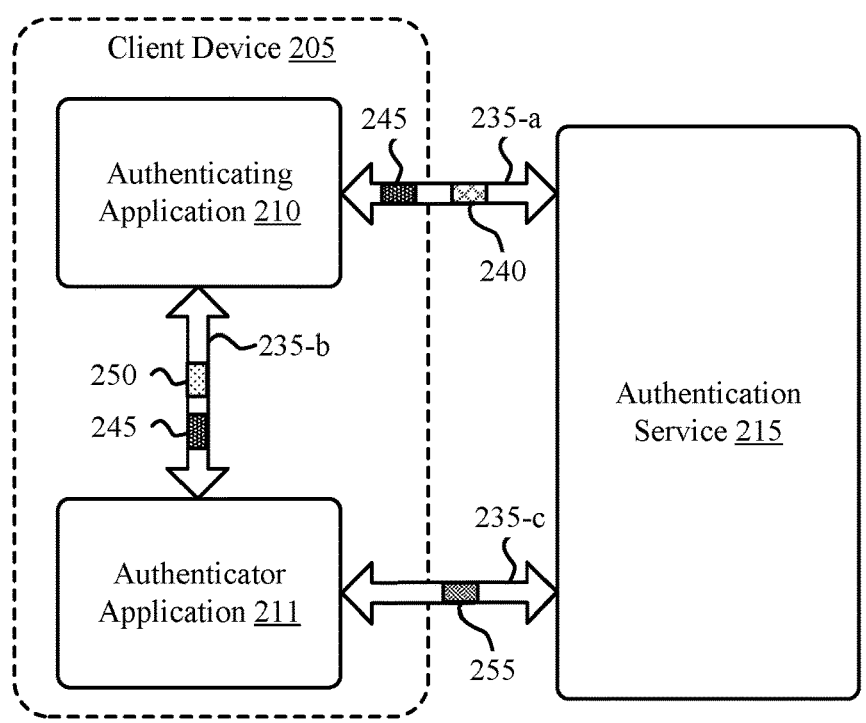

FIG. 2 shows an example of a system 200 that supports caller process verification for device-bound authenticators in accordance with aspects of the present disclosure. The system 200 includes a client devices 205, which may be an example of a client device illustrated by and described with reference to FIG. 1. The system 200 may also include an authenticating application 210 and an authenticator application 211, which may be examples of applications illustrated by and described with reference to FIG. 1. The system 200 may also include an authentication service 215, which may be an example of an authentication service illustrated by and described with reference to FIG. 1. In some examples, the client device 205 may be operated by a user that is part of an organization (e.g., by an employee or client of a business, an enterprise, a non-profit, a startup, or any other organization type). In the example of FIG. 2, the organization may use the authentication service 215 (e.g., an IDP) to manage access to resources (e.g., applications) associated with the organization and to manage identifying information associated with the user, such that the user may access the resources via the authentication service 215. For example, the authentication service 215 may manage log in requests from users, authenticate user identity for the login requests, and authorize access to resources associated with the request based on the authentication.

As illustrated in the example of FIG. 2, the user of the client device 205 may request to log into the authenticating application 210 via the authentication service 215. For example, the authenticating application 210, which may also be referred to as an authenticating binary, may be an example of a web browser through which the user may have an associated account (e.g., an email account). As part of the log in process, the authenticating application 210 may transmit an access request 240 to the authentication service 215, which may request that the authentication service 215 authorize access by the user to the authenticating application 210 (e.g., a resource). In response to the access request 240, the authentication service 215 may transmit an authentication request 245 to the authenticating application 210 via a network connection 235-a. The authentication request 245 may request that the authenticating application 210 authenticate the identity of the user via the authenticator application 211. For example, the authentication request may be an example of an authentication challenge. The authenticator application 211 may be an example of a device-bound authenticator. That is, the authenticator application 211 may be located on the client device 205 and, as such, may be used to provide a key (e.g., a device key, a private key) or secret that may be stored on the client device 205. That is, the authenticator application 211 may provide a key that may attest to the identity of the user, such that the user may access authenticating application 210. In some examples, such keys or secrets may not be extracted from the client device 205 and may therefore not be transferred to another device for authenticating the identity of the user. As such, the authenticator application 211 may provide an increased level of assurance associated with user identity authentication. In response to receiving the authentication request 245 from the authentication service 215, the authenticating application 210 may forward the authentication request 245 (e.g., the authentication challenge) to the authenticator application 211. For example, the authenticating application 210 may transmit the authentication request 245 to the authenticator application 211 via a network connection 235-b. In other words, the authenticating application 210 may establish the network connection 235-b with the authenticator application 211, such that the authenticating application 210 may communicate with the authenticator application 211 to request authentication of the identity of the user.

In response to authenticating (e.g., verifying) the identity of the user, the authenticator application 211 may provide the authenticating application 210 (or the authentication service 215) with a key (e.g., a private key or a signature from a private key) stored on the client device 205, such that the user may access the authenticating application 210. In some examples, device-bound authenticators, such as the authenticator application 211, may provide (e.g., may be assumed to provide) phishing resistance. In some examples, however, an attacker or malicious user may bypass the phishing resistance of authenticator applications. For example, the attacker may bypass phishing resistance of the authenticator application 211 by employing device impersonation to mimic how the authenticating application 210 interact with the authenticator application 211, such that the attacker may invoke the authenticator application 211. In some examples, the attacker may invoke the authenticator application 211 to fraudulently access resources, to fraudulently obtain credentials associated with the user (e.g., phish credentials), or to carry out malicious activity on the client device 205, among other examples. For example, the attacker may set up a forwarding proxy between the client device 205 (e.g., a trusted machine) and another client device used by the attacker (e.g., an untrusted machine). That is, the attacker may set up the forwarding proxy for authentication requests (e.g., the authentication request 245) transmitted to the authenticator application 211, such that the attacker may invoke the authenticator application 211. In some examples, the attacker may set up the forwarding proxy by enabling port forwarding through a secure shell (SSH). That is, the attacker may set up an intermediary (e.g., the forwarding proxy) that between the client device 205 and another client device, such that the attacker may evaluates authentication request on the other client device, takes actions (e.g., carry out malicious activities), or routes the authentication request to other destinations. Additionally, or alternatively, the attacker may use the forwarding proxy to install malware on the client device 205 that may invoke (e.g., use) the authenticator application 211. That is, the attacker may use malware capable of invoking the authenticator application 211 to impersonate the user. For example, the attacker may obfuscate the user to install malicious software (e.g., the malware), which may invoke the authenticator application 211 (e.g., directly via a loopback protocol). In other words, the attacker may bypass phishing resistance characteristics of the authenticator application 211 (e.g., may render the phishing resistant characteristic of the authenticator application 211 ineffective) by inject themselves into a flow of communication between the authenticating application 210 and the authenticator application 211 and invoke the authenticator application 211.

In some examples, to reduce a likelihood of the phishing resistance characteristics of the authenticator application 211 being bypassed by the attacker, the authentication service 215 may request that the user of the client device 205 install client transport layer security (TLS) certificates. The TLS certificates may be available to the authenticating application 210 (e.g., a web browser) and may be used to establish a secure TLS channel between the authenticating application 210 and authenticator application 211. In some examples, however, the attacker may have installed a malicious application on the client device 205 that may create a secure connection after the authentication request 245 (e.g., an authentication challenge) is forwarded from another client device (e.g., an untrusted machine) to the client device 205 (e.g., a trusted machine) via the forwarding proxy. In such an example, the secure connection may be used to invoke the authenticator application 211 (or carry out other malicious activities). That is, the client device 205 may be susceptible to malware running as a local user (or a malicious user) on the client device. In other words, techniques which rely on client TLS certificates may be susceptible to malware running at a user-privilege level.

In some other examples, to reduce a likelihood of phishing resistant authentication methods from being bypassed by the attacker, the user of the client device 205 may employ one or more APIs. For example, rather than relying on inter-process communication, which may be secured and provide a relatively bigger attack surface, the authenticator application 211 may be directly integrated into the authenticating application 210 through APIs. In some examples, while direct integration via APIs may provide increased control of which application may use the authenticator application 211 (e.g., by directly and individually integrating the authenticator application 211 into each of multiple applications), such techniques may create one or more logistical challenges. For example, direct integration of the authenticator application 211 via APIs may constrain the authenticator application 211 to a dependency on the authenticating applications (e.g., authenticating binaries, such as the authenticating application 210). For example, direct integration of the authenticator application 211 into the authenticating application 210, may lead to increased complexity for the authenticating application 210 (e.g., the authenticating binary). Additionally, or alternatively, to maintain direct integration of the authenticator application 211 in the authenticating application 210, the authenticator application 211 may be recompiled in response to the authenticating application 210 being upgraded. In other words, techniques that rely on direct integration of the authenticator application 211 via APIs may lack flexibility in which applications may be authorized (e.g., allowed) to communicate with the authenticator application 211.

In some examples, one or more techniques for caller process verification for device-bound authenticators, as described herein, may enable the authenticator application 211 or the authentication service 215 (or both) to detect or block malicious attacks by enabling an administrator of the organization to allow (e.g., explicitly allow) authentication requests from particular authenticating applications (e.g., trusted binaries). For example, the administrator may configure the authenticator application 211 or the authentication service 215 (or the authenticator application 211 and the authentication service 215 may be otherwise configured) to allow authentication requests from one or more particular sources of authenticating applications (or particular types of sources of authenticating applications) or to block authentication requests from one or more particular sources of authenticating applications (or particular types of sources of authenticating applications). In such an example, the authenticator application 211 may employ one or more techniques for caller process verification for device-bound authenticators, as described herein, to identify a source of the authenticating application 210 and to determine whether the authenticating application 210 may be identified by the administrator as being allowed to communicate with the authenticator application 211. That is, such techniques may provide a framework for the authenticator application 211 or the authentication service 215 (or both) to establish an authenticity and a signature chain of a calling process for the authenticating application 210, which may lead to increased security for the organization, among other benefits.

For example, the administrator may configure the authenticator application 211 (via the authentication service 215) to authorize one or more particular sources of authenticating applications (e.g., or types of sources, such as legitimate sources) for requesting user identity authentication via the authenticator application 211. In such an example, the authenticator application 211 may determine whether to authorize the authenticating application 210 for requesting user identity authentication via the authenticator application 211 by identifying the source of the authenticating application 210. For example, the authenticating application 210 may transmit a network request 250 to the authenticator application 211 to establish the network connection 235-b between the authenticating application 210 and the authenticator application 211. In such an example, the authenticator application 211 may identify a process (e.g., caller process) used to establish the network connection 235-b (e.g., may identify who sent the network request 250 to the authenticator application 211). For example, the network request 250 may identify a port (e.g., a TCP port) associated with the network connection 235-b. That is, the network request 250 may identify a TCP port used establish the network connection 235-b. In such an example, the port may be associated with a process identifier (ID) corresponding to the process (e.g., a session of a particular web browser or a type of network service) used to establish the network connection 235-b between the authenticating application 210 and the authenticator application 211. The authenticator application 211 (or the authentication service 215) may use the process ID to identify the source of the authenticating application 210 (e.g., to identify an authenticating binary that belongs to the process ID). Additionally, the authenticator application 211 may obtain a signature of the source of the authenticator application 211 and use the signature or metadata associated with the signature (or both) to verify that the source, and therefore the authenticating application 210, is authorized to request authentication of the identity of the user. For example, to establish the network connection 235-b between the authenticating application 210 and the authenticator application 211, the authenticating application may transmit a network request 250 to the authenticator application 211. In such an example, the network request 250 may identify a port and the authenticator application 211 may use the identified port to identify a process used to establish the network connection 235-b. The authenticator application 211 may then obtain a signature and a set of data (e.g., metadata) associated with the signature using the identified process. In such examples, authenticating the identity of the user may be based on the signature and the associated set of data. For example, the authenticator application 211 may use the signature and corresponding source (e.g., the corresponding signer of the signature) to establish trust for the metadata and then use the metadata (e.g., and the signature) to determine whether the source of the authenticating application 210 is authorized for requesting authentication of the identity of the user via the authenticator application 211. In other words, the authenticator application 211 may enforce phishing resistance by using an authenticity (e.g., trust) of metadata associated with the signature of the authenticating application 210 (e.g., forwarded by the client device 205) to verify the source of the authenticating application 210 (e.g., the calling process, a website from which the network request 250 originated).

In some examples, the authenticator application 211 may forward the metadata (e.g., the signer, binary name, application version) to the authentication service 215 (e.g., the IDP). For example, the authenticator application 211 may transmit an authentication response 255 to the authentication service 215 via a network connection 235-c. The authentication response 255 may be responsive to the authentication request 245 and may indicate the signature and the associated set of data (e.g., the source, the version of the authenticator application 211, the port, the process ID, a path of the authenticating application 210). In such examples, the authentication service 215 may use the signature and the associated set of data to determine whether the source of the authenticating application 210 is authorized for requesting authentication of the identity of the user via the authenticator application 211. Additionally, or alternatively, the authentication service 215 may authorize access by the user to the authenticating application 210 (e.g., in response to the access request 240) based on the determination (e.g., based on whether the source of the authenticating application 210 is authorized).

In some examples, the authentication service 215 may determine (e.g., autonomously or based on one or more indications from the administrator) a configuration for authenticating the identity of the user. The configuration may identity a list of sources (e.g., signers) authorized for authenticating the identity of the user, a list of sources unauthorized for authenticating the identity of the user, or one or more rules for authorizing a source for authenticating the identity of the user. For example, the one or more rules may indicate a level of legitimacy that authorized sources may satisfy (e.g., a threshold level of legitimacy). Additionally, or alternatively, the one or more rules may indicate aspects that metadata associated with authorized sources may include. In such an example, the authentication service 215 or the authenticator application 211 (or both) may determine whether the authenticating application 210 is authorized for requesting authentication of the identity of the user via the authenticator application 211 based on an association between the identified source and the set of authorized sources or the set of unauthorized sources. Additionally, or alternatively, the authentication service 215 or the authenticator application 211 (or both) may determine a level of legitimacy of the authenticating application based on the identified source (or the associate set of data) and determine whether the authenticating application 210 is authorized for requesting authentication of the identity of the user via the authenticator application 211 based on the determined level of legitimacy. In other words, the authentication service 215 or the authenticator application 211 (or both) may determine whether the authenticating application 210 is authorized for requesting authentication of the identity of the user via the authenticator application 211 in accordance with the configuration.

In some examples, the authentication service 215 may log the set of data, such that the administrator may obtain information associated with (e.g., a granular view of) applications requesting authentication of the identity of the user (e.g., versions of the applications). The logged (e.g., stored) data may include the set of data as well as data indicative of actions performed at the authentication service 215 or the authenticator application 211 based on the set of data (e.g., whether access was blocked or granted) or at the authenticating application 210 in response to being authorized to request authentication of the identity of the user via the authenticator application 211 (e.g., whether any malicious activity occurred). The authentication service 215 or the administrator may use the obtained information to detect anomalies or retroactively mitigate detected malicious access, or both. In some other examples, the authentication service 215 may provide a configuration to the authenticator application 211, such that the authenticator application 211 may autonomously determine whether to authorize the authenticating application to request authentication of the identity of the user, for example, based on the obtained signature and associated set of data. That is, the authenticator application 211 or the authentication service 215 (or both) may validate a process (e.g., caller process) of the authenticating application 210 by verifying (e.g., checking) metadata, such as application version information (e.g., binary version information), and a signature (e.g., a signer certificate) associated with a source (e.g., signer) of the authenticating application 210. In other words, one or more techniques for caller process verification for device-bound authenticators, as described herein, may provide the authenticator application 211 or the authentication service 215 (or both) with a framework for verifying a signature and associated set of metadata corresponding to the authenticating application 210, which may enable the authenticator application 211 or the authentication service 215 (or both) to validate a caller process of the authenticating application 210 and increase security for the organization, among other examples.

Figure 3:
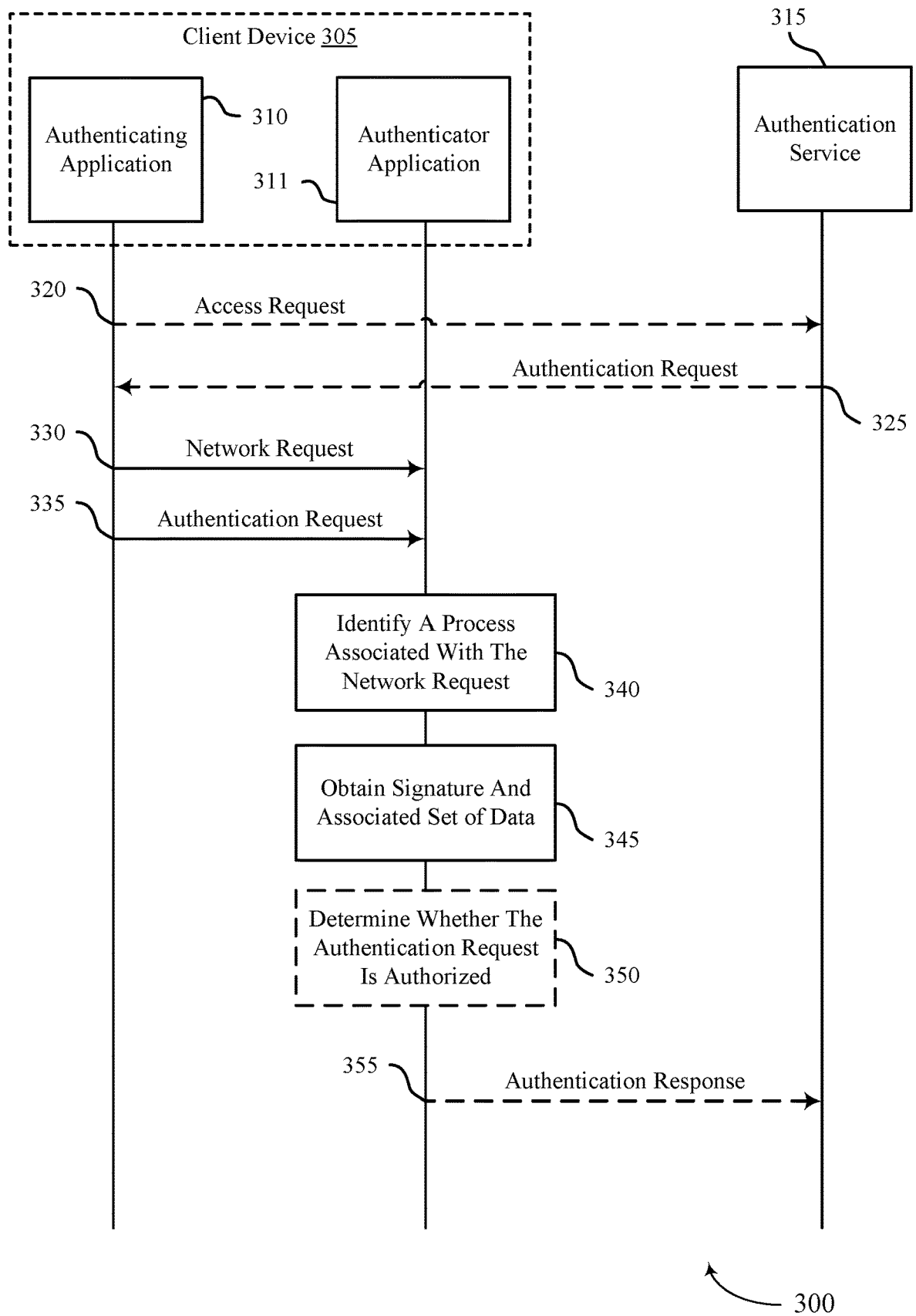
FIGS. 3 and 4 each show an example of a process flow that supports caller process verification for device-bound authenticators in accordance with aspects of the present disclosure.

FIG. 3 shows an example of a process flow 300 that supports caller process verification for device-bound authenticators in accordance with aspects of the present disclosure. The process flow 300 may implement or be implemented by aspects of the system 100 and the system 200. For example, one or more aspects of the process flow 300 may be implemented by a client device 305 (e.g., a user), which may be an example of a client device illustrated by and described with reference to FIGS. 1 and 2. For example, the client device 305 may host an authenticating application 310 and an authenticator application 311, which may be examples of applications illustrated by and described with reference to FIGS. 1 and 2. Additionally, one or more aspects of the process flow 300 may be implemented at a server hosting an authentication service 315, which may be an example of an authentication service illustrated by and described with reference to FIGS. 1 and 2. In the following description of the process flow 300, the information communicated between the authenticating application 310, the authenticator application 311, and the authentication service 315 may be performed in different orders or at different times than shown. Additionally, or alternatively, some operations may be omitted from the process flow 300 and other operations may be added to the process flow 300. In some examples, two or more operations may be combined in the process flow 300. The process flow 300 may provide for improved process verification, among other possible benefits.

In some examples, at 320, the authentication service 315 may receive an access request from the authenticating application 310. The access request may be an example of an access request illustrated by and described with reference to FIG. 2. For example, the access request may request to authorize access to a resource (e.g., a resource associated with the authenticating application 310) by a user of the authenticating application 310. That is, the user of the authenticating application 310 may request to access the authenticating application 310 (e.g., may request to log into the authenticating application 310) or one or more resources of the authenticating application 310 and the authenticating application 310 may be redirected to the authentication service 315 (e.g., an IDP), such that the access to the authenticating application 310 or the one or more resources of the authenticating application 310 may be managed by the authentication service 315.

In some examples, at 325, the authentication service 315 may transmit an authentication request to the authenticating application 310 in response to the access request received at 320. The authentication request may be an example of an authentication request illustrated by and described with reference to FIG. 2. For example, the authentication request may request to authenticate an identity of the user via the authenticator application 311. That is, the authentication request may be an example of an authentication challenge. In some examples, such as in response to receiving the authentication request, the authenticating application 310 may forwarded the authentication request to the authenticator application 311 (e.g., via inter-process communication, such as via https over loopback).

At 330, the authenticator application 311 may receive a network request from the authenticating application 310. The network request may be an example of a network request illustrated by an described with reference to FIG. 2. For example, the network request may request to establish a network connection between the authenticating application 310 and the authenticator application 311. In some examples, the network request may identify a port associated with the established network connection.

At 335, the authenticator application 311 may receive the authentication request (e.g., the forwarded authentication challenge) from the authenticating application 310. The authentication request may be an example of an authentication request illustrated by and described with reference to FIG. 2. For example, the authentication request may request to authenticate the identity of the user via the authenticator application 311. In some examples, the authenticator application 311 may receive the network request and the authentication request (e.g., the authentication challenge) via a same message. That is, the authenticator application 311 may receive a message including the network request and an authentication request (e.g., an authentication challenge) that originated from the authentication service 315. In some examples, in response to receiving the authentication request, the authenticator application may request (e.g., challenge for) user-provided mediation, such as one or more authenticators (e.g., including but not limited to a PIN, biometrics, or consent), to verify the identity of the user.

In some examples, an attacker may obtain the authentication request. For example, the attacker may acquire the authentication request (e.g., authentication challenge) forwarded from the authentication service 315. That is, the attacker may acquire the authentication request from the authenticating application 310 or via other means. In some examples, the attacker may acquire the authentication challenge from the authenticating application 310 (e.g., the web browser) or via other means on a second client device associated with the attacker (e.g., other means on an attacker device). In some examples, such as examples in which the attacker may possesses an authentication challenge, the attacker may relay information associated with the authentication challenge to another authenticator application running on a third client device (e.g., a trust machine). That is, the attacker may relay the authentication request or information associated with the authentication request to an authenticator application running on a third client device that may be trusted by the authentication service 315 or the authenticator application 311 (or both). In some examples, such as examples in which consent may be given from the attacker (e.g., a malicious user or a source of a phishing attack), the third client device (e.g., the trusted device) may authenticate on behalf of the second client device (e.g., the attacker device), which may enable the attacker access via the second device (e.g., irrespective of the second device being an untrusted device).

In some examples, such an attack may include use of one or more malicious processes on the third device (e.g., a process on the trusted device other than authentication), such as a malicious binary or malicious use of a generic binary (e.g., an open SSH server process (SSHD)). To mitigate the attack, the authenticator application 311 may employ one or more techniques for caller process verification for device-bound authenticators, as described herein. For example, the authenticator application 311 may perform one or more steps to establish an authenticity and a signature chain of a calling process for the authenticating application 310, for example, while the network connection between the authenticating application 310 and authenticator application 311 is established.

At 340, the authenticator application 311 may identify a process (e.g., a caller process) use to establish the network connection between the authenticating application 310 and the authenticator application 311. That is, the authenticator application 311 may identify a process used to transmit the network request at 330. In some examples, the authenticator application 311 may identify the process based on a first port indicated via the network request. For example, the authenticator application 311 may establish one or more ports (e.g., TCP ports) used for inbound and outbound network connections at the client device 305. The authenticator application 311 may correlate the established ports to a second port the authenticator application 311 may be listening on (e.g., a port used for authentication processes). In some examples, based on the correlation (e.g., and one or more and heuristics) the authenticator application 311 may determine the first port (e.g., the outbound connection) that may be correlated to the network request (e.g., a current incoming request). The authenticator application 311 may then determine a process ID of the network request (e.g., a process ID corresponding to the process) based on the first port. In some examples, the heuristics may include a validation that the first port (e.g., the determined outbound connection, a connection port associated with the authenticating application 310, a connection on the process side) is local. Additionally, or alternatively, the heuristics may include a comparison of a connection state (e.g., a TCP connection state) associated with the client device 305 (e.g., a connection on the process side, a connection on the server side) which may enable determination of additional processes (e.g., new processes) as well as processed requests. In some examples, such as for parallel requests, the heuristics may include a correlation between the process ID to an http request ID that may be associated with the authentication request and that may enable the authenticator application 311 to detect one or more processes that may have established connections (e.g., connection in flight). In some examples, detecting one or more processes that may have established connections may enable the authenticator application 311 to detect a process that may be a source of the network request received at 330 (or the authentication request received at 335). That is, the authenticator application 311 may use the correlation and the detected processes to identify the process used to establish the network connection between the authenticating application 310 and the authenticator application 311 (e.g., which of the detected processes may be responsible for the incoming request). In other words, the authenticator application 311 may use the first port indicated via the network request to look up TCP tables (e.g., on the operating system (OS)) and determine one or more process IDs that may have connections established on the first port. The authenticator application 311 may then use the determined process IDs to establish whether one or more non-authenticator processes have connection established on the first port. In some examples, the authenticator application 311 may determine that more than one non-authenticator process has an established connection on the first port. In such an example, the authenticator application 311 may block authentication requests from the application (e.g., the signature of the authenticating application 310 may fail). In some other examples, the authenticator application 311 may determine that a single non-authenticator process has an established connection on the first port. In such an example, the process may correspond to the process used to establish the network connection.

In some examples, the authenticator application 311 may ascertain a path to the authenticating application 310 (e.g., a path to the authenticating binary, a path to a binary image that may own the process). Additionally, the authenticator application 311 may determine whether the authenticating application 310 is associated with a signature. That is, the authenticator application 311 may determine whether the authenticating application 310 is signed. In other words, the authenticator application 311 may determine whether the binary image from which the identified process originated a signed binary. In some examples, the authenticator application 311 may determine that the authenticator application is signed and obtain the signature. The authenticator application 311 may then determine to validate a trust chain of the signature.

At 345, the authenticator application 311 may obtain the signature and a set of data (e.g., metadata) associated with the signature based on the identified process. The set of data may be an example of a set of data as described with reference to FIG. 2. For example, the set of data may include signature validation result or metadata (or both) that may identify the authenticating application 310 (e.g., the calling binary) and the chain of trust of the signature. That is, the authenticator application 311 may extract the signature validation result and metadata that may identify both the authenticating application 310 (e.g., the calling binary) and the chain of trust of the signature. In some examples, the authenticator application 311 may use one or more APIs (e.g., code signature APIs) to gather the signature metadata. For example, the metadata may include a path associated with the authenticating application 310 (e.g., a binary path, which may be indicated via "binaryPath"), an identifier of the authenticating application 310 (e.g., a binary identifier, which may be indicated via "binaryIdentifier"), a version of the authenticating application 310 (e.g., which may be indicated via "applicationVersion"), of a level of integrity associated with the signature, a validation status associated with a certificate chain of the signature (e.g., which may be indicated via "validationStatus"), a signer context (e.g., which may be indicated via "signerContext"), a distinguished name corresponding to the signature (e.g., which may be indicated via "distinguishedName"), a key identifier corresponding to the signature (e.g., which may be indicated via "keyIdentifier"), among other examples.

In some examples, the authenticator application 311 may evaluate one or more prerequisites (e.g., perform one or more checks) to determine whether the set of associated data is valid (e.g., includes valid metadata). That is, additional checks may be performed within the authenticator application 311 to validate (e.g., ensure) that the authenticator application 311 is producing valid metadata. For example, the authenticator application 311 may determine whether the signature of the authenticating application 310 (e.g., the running application) matches one or more parameters (e.g., matches expectations, is static and tampering). Additionally, or alternatively, the authenticator application 311 may perform one or more runtime signature checks on dependent libraries or check for dynamic instrumentation (e.g., ptrace or frida), or both. In some examples, such as examples in which the obtained (e.g., generated) metadata may not be trusted, the authenticator application 311 may crash to prevent execution of an authentication process (e.g., an authentication flows). In some examples, the client device 305 may perform one or more checks to determine whether the set of associated data is valid (e.g., includes valid metadata). That is, server-side checks may be performed, for example, using one or more OS mechanisms. In some examples, determining that the obtained (e.g., generated) metadata may not be trusted may lead to a failed check. A failed check may lead to the client device 305 entering a suspended state, which may prevent authentication processes (e.g., authentication flows).

In some examples, the data obtained at 345 may be based on a configuration for authenticating the identity of the user. For example, the authenticator application 311 may be configured with a configuration that may indicate one or more types of data to be obtained for determining whether an application (e.g., the authenticating application 310) is authorized for requesting authentication of the identity of the user. Additionally, or alternatively, the configuration may indicate information for determining whether an application (e.g., the authenticating application 310) is authorized for requesting authentication of the identity of the user. That is, the data obtained at 345 or determining whether the authenticating application 310 is authorized for requesting authentication of the identity of the user, or both, may be based on the configuration.

In some examples, the authenticator application 311 may receive a configuration indication from the authentication service 315. The configuration may be an example of a configuration for authenticating the identity of the user. In some examples, the authenticator application 311 may receive the indication of the configuration via the network request received at 330 or the authentication request received at 335 (or both). That is, the authentication challenge forwarded from the authentication service 315 may indicate the configuration. In other words, at 330, the authenticator application 311 may receive a message including the indication of the configuration, the indication of the network request, or the indication of the authentication request, or any combination thereof.

In some examples, the indication of the configuration may correspond to trusted (e.g., non-tamped with) data. For example, the authentication service 315 may establish a trust relationship with the authenticator application 311, such that the authenticator application 311 may access one or more public keys of the authentication service 315 to verify that data (e.g., the indication of the configuration, the authentication request) from the authentication service 315 is properly signed. For example, the authenticator application 311 may use a public key associated with the authentication service 315 to validate a signature of the message that includes the indication of the configuration. In such an example, use of the configuration to determine whether the second application is authorized for requesting authentication of the identity of the user may be based on verifying the signature from the authentication service 315 (e.g., verifying that the message is properly signed, verifying that the message includes non-tampered with data). In other words, the message carrying the indication of the configuration may be signed and, as such, may not be tampered with (e.g., by an attacker).

In some examples, at 350, the authenticator application 311 may determine whether the authentication request is authorized. For example, the authenticator application 311 may determine whether the authenticating application 310 that transmitted the authentication request is authorized for requesting authentication of the identity of the user. In such an example, the authenticator application 311 may use the signature, the associated set of data, or the configuration, or any combination thereof, to make the determination. For example, the authenticator application 311 may use the signature or the associated set of data (or both) to identify a source of the authenticating application 310. The authenticator application 311 may then use the configuration to determine whether the identified source is authorized to request authentication of the identity of the user. For example, the configuration may indicate one or more sources authorized (e.g., allowed sources) for requesting authentication of the identity of the user, one or more sources unauthorized (e.g., non-allowed sources) for requesting authentication of the identity of the user, one or more types of sources authorized (or unauthorized) for requesting authentication of the identity of the user, or one or more rules for determine whether a source (e.g., and therefore an application) is authorized for requesting authentication of the identity of the user, or any combination thereof. In other words, the authentication service 315 may supply a list of attributes (e.g., parameters) for the authenticating application 310 (e.g., the authenticating binary) via the authentication request (e.g., during the creation and transmission of the authenticator challenge). The authenticator application 311 may the use the list of attributes to block or allow authentication requests from the authenticating application 310 (e.g., to stop or continue a flow of the authentication process). In some examples, enabling the authenticator application 311 to block or allow authentication requests from authenticating applications may provide an increased security level (e.g., due to the authentication process be stopped relatively early the authentication process). In some examples, the authentication service 315 may enroll one or more public keys (e.g., particular public keys) created by the authenticator application 311 which may attest to data (e.g., any data) produced by the authenticator application 311 and sent to the authentication service 315. For example, the authenticator application 311 may use a public key to attest to data reported to the authentication service 315 (e.g., the IDP).

For example, at 355, the authenticator application 311 may transmit an authentication response to the authentication service 315. The authentication response may be an example of an authentication response illustrated by and described with reference to FIG. 2. For example, the authentication response may be responsive to the authentication request and may indicate the signature or the set of data, or both. In other words, the authenticator application 311 may use the authentication response transmitted at 350 to report the signature and the set of data to the authentication service 315 (e.g., to the IDP, to a server hosting the authentication service 315). In some examples, the authentication service 315 may log the reported set of data. Additionally, or alternatively, the authentication service 315 may evaluate (e.g., check) the reported set of data (e.g., the signature metadata) and block non-authorized applications or report authentication attempts from non-authorized applications to the administrator, or both. That is, the authentication service 315 may check the signature metadata and block or alert the administrator (or both) on applications associated with sources on a list of non-allowed sources (e.g., associated with binary signers on a non-allow list of binary signers). In other words, the authenticator application 311 may package the metadata into the challenge response for the authentication service 315, such that the authentication service 315 may make decisions on, for example, whether to authorize access to the authenticating application 310 by the user or whether the authenticating application 310 is authorized to request authentication of the identity of the user via the authenticator application 311.

In some examples, enabling the authenticator application 311 or the authentication service 315 (or both) to validate a source (e.g., caller process) of the authenticating application 310 by verifying (e.g., checking) metadata associated with the source of the authenticating application 310, may reduce a likelihood of phishing resistance provided by the authenticator application 311 from being bypassed, among other benefits.

Figure 4:
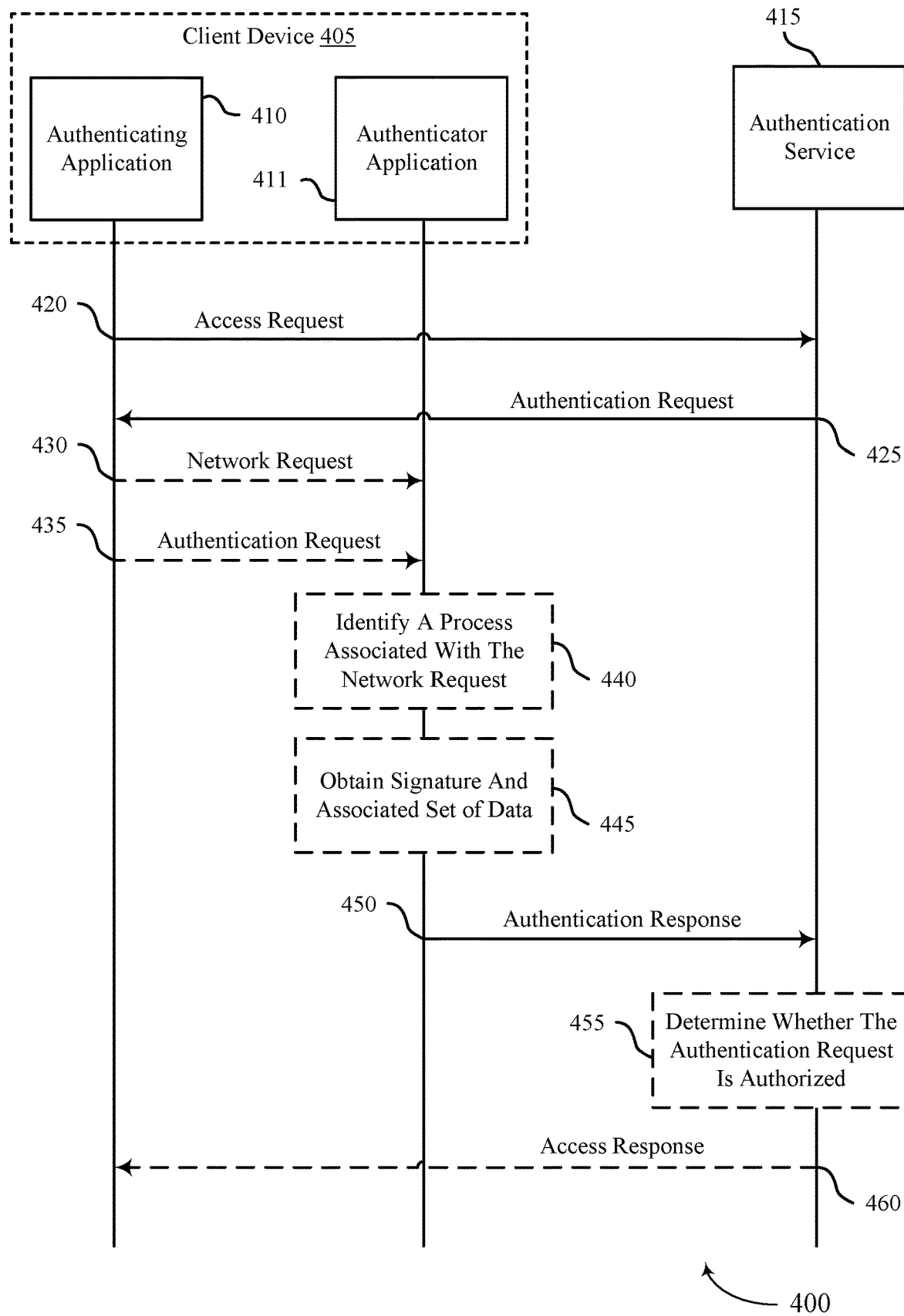

FIG. 4 shows an example of a process flow 400 that supports caller process verification for device-bound authenticators in accordance with aspects of the present disclosure. The process flow 400 may implement or be implemented by aspects of the system 100, the system 200, and the process flow 300. For example, one or more aspects of the process flow 400 may be implemented by a client device 405 (e.g., a user), which may be an example of a client device illustrated by and described with reference to FIGS. 1 through 3. For example, the client device 405 may host (e.g., run) an authenticating application 410 (e.g., a web browser) and an authenticator application 411, which may be examples of applications illustrated by and described with reference to FIGS. 1 through 3. Additionally, one or more aspects of the process flow 400 may be implemented at a server hosting an authentication service 415, which may be an example of an authentication service illustrated by and described with reference to FIGS. 1 through 3. In the following description of the process flow 400, the information communicated between the authenticating application 410, the authenticator application 411, and the authentication service 415 may be performed in different orders or at different times than shown. Additionally, or alternatively, some operations may be omitted from the process flow 400 and other operations may be added to the process flow 400. In some examples, two or more of the operations may be combined in the process flow 400. The process flow 400 may provide for improved process verification, among other possible benefits.

At 420, the authentication service 415 may receive an access request from the authenticating application 410. The access request may be an example of an access request illustrated by and described with reference to FIGS. 2 and 3. For example, the access request may request to authorize access to a resource (e.g., a resource associated with the authenticating application 410) by a user of the authenticating application 410. As an illustrative example, the authenticating application 410 may be a web browser through which the user may have an associated account (e.g., an email account). In such an example, the request may correspond to a request of the user to access the account via the authentication service 415.

At 425, the authentication service 415 may transmit an authentication request to the authenticating application 410 in response to the access request. The authentication request may be an example of an authentication request illustrated by and described with reference to FIGS. 2 and 3. For example, the authentication request may request to authenticate an identity of the user via the authenticator application 311. That is, the authentication request may be an authentication challenge. In other words, the authentication service 415 may create an authentication challenge in response to the access request received at 420, such that the identity of the user may be verified and the user may access the account. The authentication challenge may then be provided to the authenticating application 410 (e.g., the authenticating binary, the web browser).

In some examples, at 430, the authenticating application 410 may transmit a network request to the authenticator application 411. The network request may be an example of a network request illustrated by an described with reference to FIGS. 2 and 3. For example, the network request may request to establish a network connection between the authenticating application 410 and the authenticator application 411. In some examples, the network request may identify a port associated with the established network connection.

In some examples, at 435, the authenticating application 410 may forward the authentication request to the authenticator application 411 (e.g., via inter-process communication, such as via https over loopback). That is, the authentication challenge may be forwarded to the authenticator application 411, such that authentication of the identity of the user may be managed by the authenticator application 411 (or by the authentication service 415 via the authenticator application 411). In some examples, the authenticator application 411 may use the port identified by the network request to identify a source (e.g., a calling process) of the authenticating application 410.

In some examples, at 440, the authenticator application 411 may identify a process (e.g., a caller process) use to establish the network connection between the authenticating application 410 and the authenticator application 411. That is, the authenticator application 411 may identify a process used to transmit the network request at 430. For example, the authenticator application 411 may obtain a port used to establish the network connection with the authenticating application 410 and may identify a process ID via the port. In some examples, the authenticator application 411 may use the process ID to identify the source (e.g., to find out which process created the established connection). Additionally, the authenticator application 411 may determine a path and signature associated with the authenticating application 410. In some examples, the signature may be used to validate a trust chain and determine the source (e.g., determine who created the authenticating application 410). In other words, the authenticator application 411 may use the OS of the client device 405 to evaluate a TCP connection table and identify outbound connections for the OS. The authenticator application 411 may then correlate an outbound connection to the port indicated via the network connection to obtain a process ID associated with the network connection.

In some examples, at 445, the authenticator application 411 may obtain a signature of the source of the authenticating application 410 and a set of data associated with the signature. The set of data may be an example of a set of data as described with reference to FIGS. 2 and 3. For example, the set of data may include signature validation result or metadata (or both) that may identify the source of authenticating application 410 (e.g., the calling binary) and the chain of trust of the signature. In other words, because the authenticator application 411 and the authenticating application 410 are located on (e.g., hosted by) the client device 405 (e.g., a same device), the authenticator application 411 may have access to information about the authenticating application 410. For example, the authenticator application 411 may use one or more APIs (or third-party applications) to determine the source (e.g., an authenticating binary) that is associated with the process ID. Additionally, the authenticator application 411 may determine whether the source (e.g., authenticating binary) is associated with a signature, and whether a trust chain for the signature may be validated. In other words, the authenticator application 411 may obtain the set of data from the OS of the client device 405, an authentication service associated with the user, or a third-party application, or any combination thereof.

At 450, the authentication service 415 may receive an authentication response from the authenticator application 411. The authentication response may be an example of an authentication response illustrated by and described with reference to FIGS. 2 and 3. For example, the authentication response may be responsive to the authentication request and may indicate the signature or the set of data, or both. In some examples, authorizing access to the resource may be based on the signature or the set of data, or both.

For example, at 455, the authentication service 415 may determine whether the authentication request is authorized. That is, the authentication service 415 may determine whether the authenticating application 410 that transmitted the authentication request is authorized for requesting authentication of the identity of the user. In such an example, the authentication service 415 may use the signature, the associated set of data, or a configuration, or any combination thereof, to make the determination. In other words, in response to obtaining the metadata of the calling process, one or more configurations (e.g., a large range of configurations) may be used to identify one or more responses to be performed by the authentication service 415.

For example, the set of data (e.g., the metadata) may include data indicative of a location of code associated with the authenticating application 410, data indicative of a name of authenticating application 410, data indicative of a name of a file including the code associated with the authenticating application 410, data indicative of the process ID, data indicative of a version associated with the authenticating application 410, data indicative of a level of integrity associated with the signature, data indicative of a validation status associated with a certificate chain of the signature, data indicative of a distinguished name corresponding to the signature, data indicative of a key identifier corresponding to the signature, or any combination thereof. In some examples, the authentication service may log the set of data or use the set of data, for example, to determine whether the authenticating application 410 is authorized to request authorization of the identity of the user vias the authenticator application 411. For example, the executable code location and the distinguished name of the signature (e.g., the certificate distinguished name, the subject summary) may be logged, while other types of data included in the set of data may be used, for example, to alert the administrator or block authentication request from the authenticating application 410, among other examples. In some examples, some data included in the set of data (e.g., the path to the executable code or the signer distinguished name) may be used for investigation of suspicious authentication attempts by the administrator and other data may be used by the authentication service 415 (or the authenticator application 411) to make access decisions. In other words, the set of data associated with the signature (e.g., the metadata) may include multiple types of data usable by the authentication service 415 (or the authenticator application 411) to make multiple types of determinations or perform multiple types of actions associated with the user or the authenticating application 410, or both.

In some examples, the authentication service 415 may determine a configuration for authenticating the identity of the user, which may be used to determine whether the authenticating application 410 is authorized for requesting authentication of the identity of the user via the authenticator application 411. In some examples, the authentication service 415 may determine the configuration based on an indication of the configuration or one or more aspects of the configuration from the administrator. For example, the administrator may configure the authentication service 415 to authorize application that may be signed by legitimate sources. In some other examples, the administrator my configure the authentication service 415 to authorize applications with sources include in a set of authorized sources. In some examples, the administrator may configure the authentication service 415 to authorize applications with sources excluded from a set of unauthorized sources. Additionally, or alternatively, the authentication service 415 may determine the configuration based on a default configuration (e.g., a default set of authorized or unauthorized sources). In some examples, the authentication service 415 may be configured to authorize applications in which the signature (or the associated set of data) of the source satisfies a threshold level of legitimacy. In other words, the authentication service 415 may check the metadata, log the metadata (e.g., and send the metadata to a risk analysis service), and use one or more configurations to block (e.g., automatically block) unsigned callers (e.g., unknown binary creator) or known applications (e.g., system tools) that may not be used to request authentication of user identity (e.g., SSH, cURL, Fiddler.exe). In some examples, the configuration may correspond to a recommended configuration, a default configurations, or a secure-by-default configurations. For example, the authentication service 415 may transmit a recommendation for the configuration to the administrator based on historical access request associated with the authenticating application 410 (or other authenticating applications associated with the user). In such an example, the administrator may indicate a configuration to the authentication service based on the recommendation. In some examples, such as examples in which the administrator may indicate a configuration to the authentication service 415 (e.g., may create a custom configuration via the authentication service 415) the configuration may indicate one or more applications or one or more sources of applications (e.g., one or more signers) that may be authorized for requesting user identity authentication via the authenticator application 411. In such an example, the authentication service 415 may use the configuration to authorize the authenticating application 410 to request user identity authorization.

In some examples, at 460, the authentication service 415 may transmit an access response to the authenticating application 410. The access response may be based on whether the authenticating application 410 is authorized for requesting user identity authentication. That is, the authentication service 415 may authorizing access to the resource based on the determination at 455. In some examples, enabling the authentication service 415 to validate a caller process of the authenticating application 410 by verifying (e.g., checking) metadata associated with the source of the authenticating application 410, may reduce a likelihood of the authentication service 415 providing unauthorized access to the authenticating application 410, among other benefits.

Figure 5:
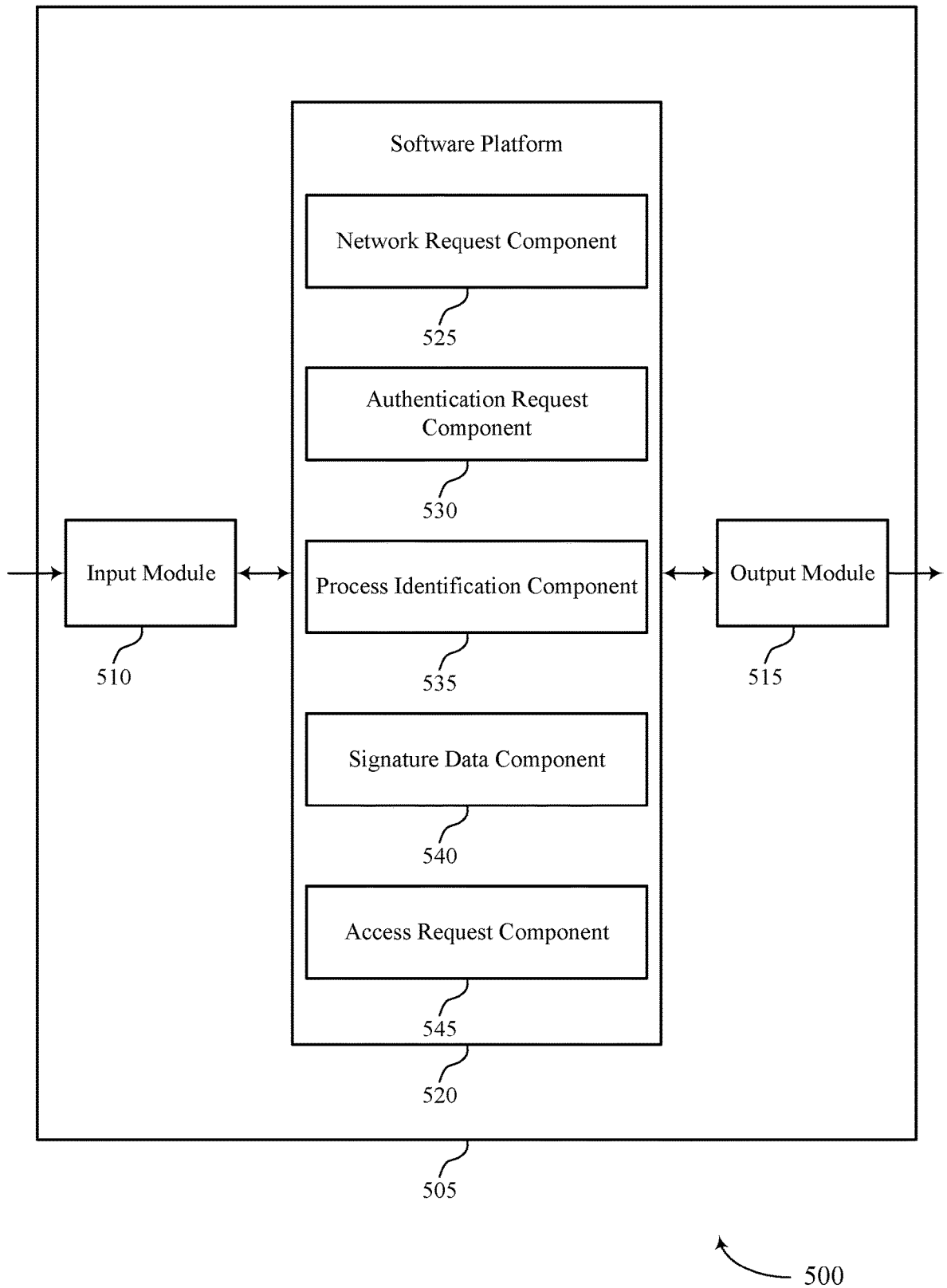
FIG. 5 shows a block diagram of an apparatus that supports caller process verification for device-bound authenticators in accordance with aspects of the present disclosure.

FIG. 5 shows a block diagram 500 of a device 505 that supports caller process verification for device-bound authenticators in accordance with aspects of the present disclosure. The device 505 may include an input module 510, an output module 515, and a software platform 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an OS such as iOS®, ANDROID®, MS-DOS®, MS-WINDOWS®, OS/2®, UNIX®, LINUX®, or another known OS to handle input signals. The input module 510 may send aspects of these input signals to other components of the device 505 for processing. For example, the input module 510 may transmit input signals to the software platform 520 to support caller process verification for device-bound authenticators. In some cases, the input module 510 may be a component of an I/O controller 710 as described with reference to FIG. 7.

The output module 515 may manage output signals for the device 505. For example, the output module 515 may receive signals from other components of the device 505, such as the software platform 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the software platform 520 may include a network request component 525, an authentication request component 530, a process identification component 535, a signature data component 540, an access request component 545, or any combination thereof. In some examples, the software platform 520, or various components thereof, may be configured to perform various operations (e.g., receiving, monitoring, transmitting) using or otherwise in cooperation with the input module 510, the output module 515, or both. For example, the software platform 520 may receive information from the input module 510, send information to the output module 515, or be integrated in combination with the input module 510, the output module 515, or both to receive information, transmit information, or perform various other operations as described herein.

The software platform 520 may support process verification at a first application of a device in accordance with examples as disclosed herein. The network request component 525 may be configured to support receiving, from a second application of the device, a first request to establish a network connection between the first application and the second application, where the first request identifies a port associated with the network connection. The authentication request component 530 may be configured to support receiving, from the second application via the network connection, a second request to authenticate an identity of a user of the second application via the first application. The process identification component 535 may be configured to support identifying, in response to the second request, a process used to establish the network connection between the first application and the second application based on the port. The signature data component 540 may be configured to support obtaining a signature and a set of data associated with the signature based on the identified process, where authenticating the identity of the user is based on the signature and the associated set of data.

Additionally, or alternatively, the software platform 520 may support process verification at an authentication service of a first device in accordance with examples as disclosed herein. The access request component 545 may be configured to support receiving, from a first application of a second device, a first request to authorize access to a resource by a user of the first application. The authentication request component 530 may be configured to support transmitting, to the first application in response to the first request, a second request to authenticate an identity of the user via a second application of the second device. The signature data component 540 may be configured to support receiving, from the second application in response to the second request, a set of data associated with a signature of the first application, where authorizing access to the resource is based on the set of data.

Figure 6:
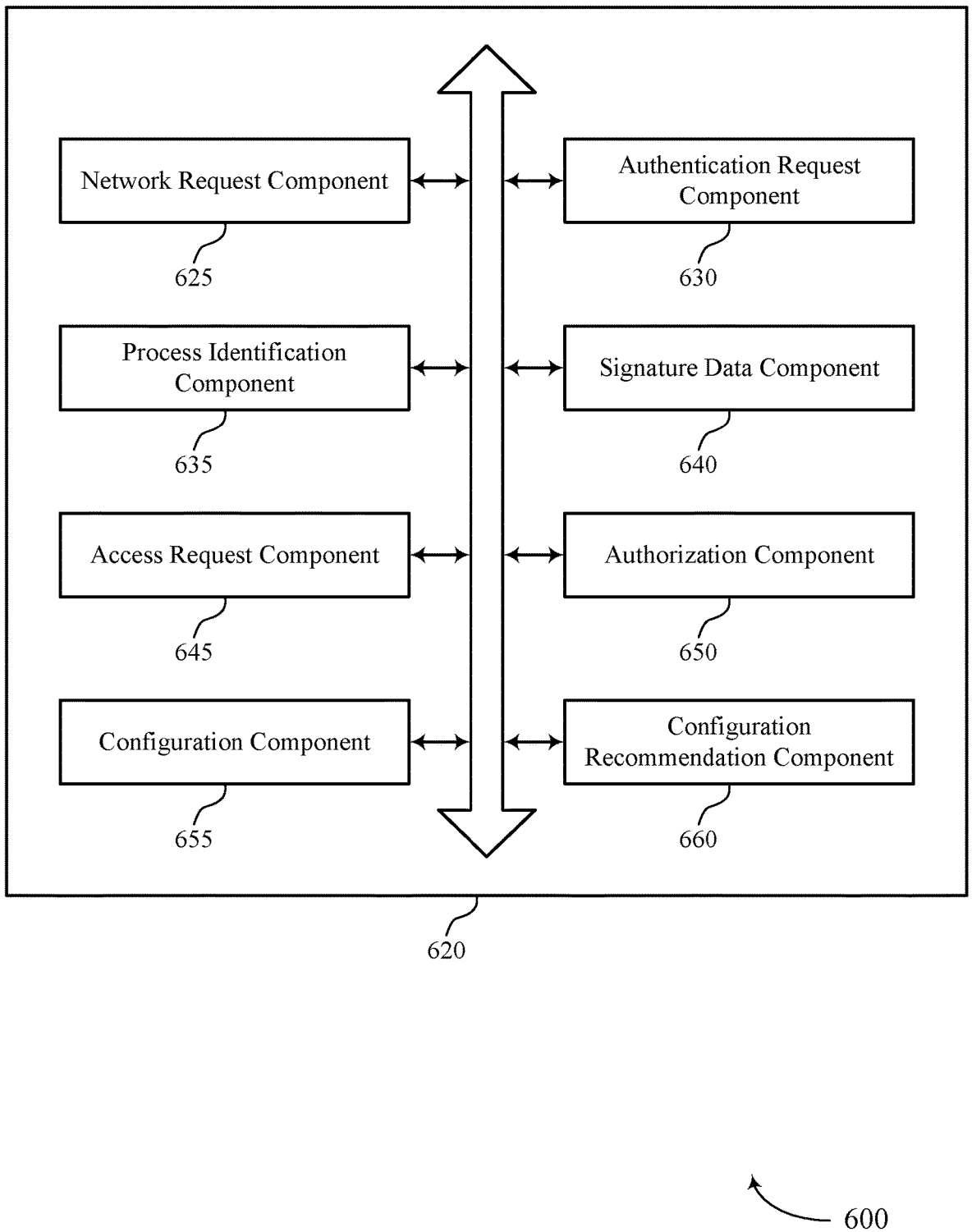
FIG. 6 shows a block diagram of a software platform that supports caller process verification for device-bound authenticators in accordance with aspects of the present disclosure.

FIG. 6 shows a block diagram 600 of a software platform 620 that supports caller process verification for device-bound authenticators in accordance with aspects of the present disclosure. The software platform 620 may be an example of aspects of a software platform or a software platform 520, or both, as described herein. The software platform 620, or various components thereof, may be an example of means for performing various aspects of caller process verification for device-bound authenticators as described herein. For example, the software platform 620 may include a network request component 625, an authentication request component 630, a process identification component 635, a signature data component 640, an access request component 645, an authorization component 650, a configuration component 655, a configuration recommendation component 660, or any combination thereof. Each of these components may communicate, directly or indirectly, with one another (e.g., via one or more buses).

The software platform 620 may support process verification at a first application of a device in accordance with examples as disclosed herein. The network request component 625 may be configured to support receiving, from a second application of the device, a first request to establish a network connection between the first application and the second application, where the first request identifies a port associated with the network connection. The authentication request component 630 may be configured to support receiving, from the second application via the network connection, a second request to authenticate an identity of a user of the second application via the first application. The process identification component 635 may be configured to support identifying, in response to the second request, a process used to establish the network connection between the first application and the second application based on the port. The signature data component 640 may be configured to support obtaining a signature and a set of data associated with the signature based on the identified process, where authenticating the identity of the user is based on the signature and the associated set of data.

In some examples, the authorization component 650 may be configured to support determining, based on the set of data, whether the second application is authorized for requesting authentication of the identity of the user via the first application. In some examples, the authentication request component 630 may be configured to support authenticating the identity of the user based on the determination.

In some examples, the authorization component 650 may be configured to support identifying a source of the second application based on the set of data, where determining whether the second application is authorized for requesting authentication of the identity of the user is based on the identified source.

In some examples, the authorization component 650 may be configured to support determining a level of legitimacy of the second application based on the identified source, where determining whether the second application is authorized for requesting authentication of the identity of the user is based on the determined level of legitimacy.

In some examples, the authorization component 650 may be configured to support determining an association between the identified source and a set of authorized sources or a set of unauthorized sources, where determining whether the second application is authorized for requesting authentication of the identity of the user is based on the determined association.

In some examples, the configuration component 655 may be configured to support receiving an indication of a configuration for authenticating the identity of the user, where determining whether the second application is authorized for requesting authentication of the identity of the user is based on the configuration.

In some examples, to support receiving the second request, the network request component 625 may be configured to support receiving, from the second application via the network connection, a message including the indication of the configuration and an indication of the second request, where the second request includes an authentication challenge, and where the configuration and the authentication challenge originated from an authentication service associated with the user.

In some examples, the signature data component 640 may be configured to support verifying a signature of the message based on a public key associated with the authentication service, where use of the configuration to determine whether the second application is authorized for requesting authentication of the identity of the user is based on verifying the signature. In some examples, the set of data includes one or more types of data. In some examples, the one or more types of data are based on the configuration.

In some examples, the authorization component 650 may be configured to support transmitting, to an authentication service associated with the user, a message including an indication of the set of data, where authenticating the identity of the user is based on transmitting the message to the authentication service.

In some examples, the second request includes an authentication challenge originating from the authentication service. In some examples, the message includes the indication of the set of data and a response to the authentication challenge.

In some examples, to support obtaining the set of data, the signature data component 640 may be configured to support obtaining the set of data from an OS of the device, an authentication service associated with the user, or a third-party application, or any combination thereof.

In some examples, to support obtaining the set of data, the signature data component 640 may be configured to support obtaining data indicative of a location of code associated with the second application, data indicative of a name of the second application, data indicative of a name of a file including the code associated with the second application, data indicative of a process identifier corresponding to the process, data indicative of a version associated with the second application, data indicative of a level of integrity associated with the signature, data indicative of a validation status associated with a certificate chain of the signature, data indicative of a distinguished name corresponding to the signature, data indicative of a key identifier corresponding to the signature, or any combination thereof.

Additionally, or alternatively, the software platform 620 may support process verification at an authentication service of a first device in accordance with examples as disclosed herein. The access request component 645 may be configured to support receiving, from a first application of a second device, a first request to authorize access to a resource by a user of the first application. In some examples, the authentication request component 630 may be configured to support transmitting, to the first application in response to the first request, a second request to authenticate an identity of the user via a second application of the second device. In some examples, the signature data component 640 may be configured to support receiving, from the second application in response to the second request, a set of data associated with a signature of the first application, where authorizing access to the resource is based on the set of data.

In some examples, the authorization component 650 may be configured to support determining, based on the set of data, whether the first application is authorized for requesting authentication of the identity of the user via the second application. In some examples, the access request component 645 may be configured to support authorizing access to the resource based on the determination.

In some examples, the configuration component 655 may be configured to support determining a configuration for authenticating the identity of the user, where determining whether the first application is authorized for requesting authentication of the identity of the user via the second application is based on the configuration.

In some examples, the configuration component 655 may be configured to support receiving, from a third device associated with an organization of the user, a message including an indication of the configuration or one or more parameters associated with the configuration, where determining the configuration is based on the message.

In some examples, the configuration recommendation component 660 may be configured to support transmitting, to the third device, a recommendation for the configuration based on historical access request associated with the first application, where the indication of the configuration is based on the recommendation.

In some examples, the signature data component 640 may be configured to support storing data associated with the first request, where the stored data includes the set of data or data indicative of an action performed by the first application in response to authorizing access to the resource, or both. In some examples, the set of data includes one or more types of data. In some examples, the one or more types of data are based on the configuration.

In some examples, the signature data component 640 may be configured to support identifying a source of the first application based on the set of data, where determining whether the first application is authorized for requesting authentication of the identity of the user is based on the identified source.

In some examples, the signature data component 640 may be configured to support determining a level of legitimacy of the first application based on the identified source, where determining whether the first application is authorized for requesting authentication of the identity of the user is based on the determined level of legitimacy.

In some examples, the signature data component 640 may be configured to support determining an association between the identified source and a set of authorized sources or a set of unauthorized sources, where determining whether the first application is authorized for requesting authentication of the identity of the user is based on the determined association. In some examples, the second request includes an authentication challenge. In some examples, the set of data is obtained from an OS of the second device, the authentication service, or a third-party application, or any combination thereof.

In some examples, the set of data includes data indicative of a location of code associated with the first application, data indicative of a name of the first application, data indicative of a name of a file including the code associated with the first application, data indicative of a process used to establish a network connection between the first application and the second application, data indicative of a version associated with the first application, data indicative of a level of integrity associated with the signature, data indicative of a validation status associated with a certificate chain of the signature, data indicative of a distinguished name corresponding to the signature, data indicative of a key identifier corresponding to the signature, or any combination thereof.

Figure 7:
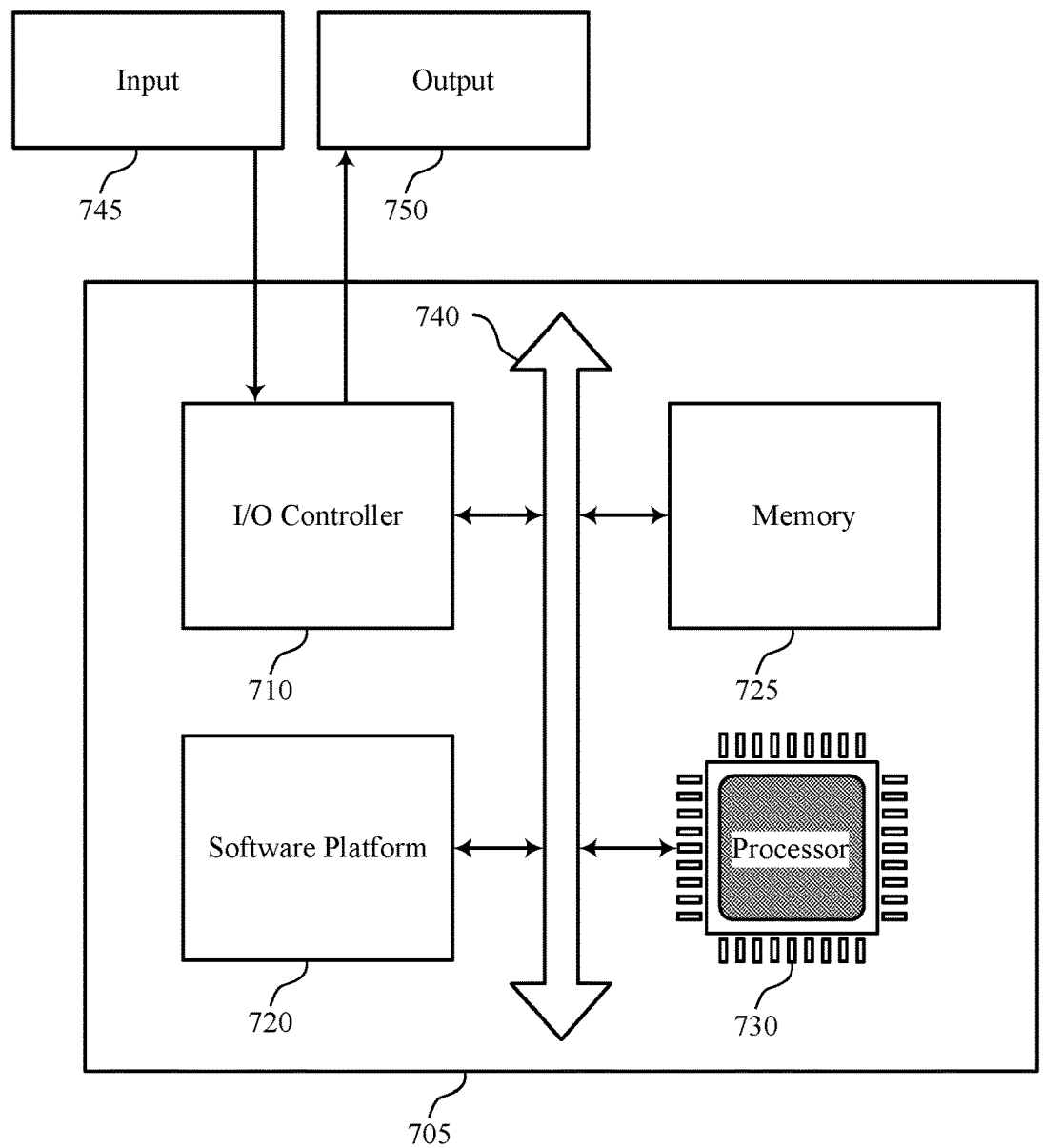
FIG. 7 shows a diagram of a system including a device that supports caller process verification for device-bound authenticators in accordance with aspects of the present disclosure.

FIG. 7 shows a diagram of a system 700 including a device 705 that supports caller process verification for device-bound authenticators in accordance with aspects of the present disclosure. The device 705 may be an example of or include the components of a device 505 as described herein. The device 705 may include components for bi-directional data communications including components for transmitting and receiving communications, such as a software platform 720, an I/O controller 710, \ a memory 725, and a processor 730. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an OS such as iOS®, ANDROID®, MS-DOS®, MS-WINDOWS®, OS/2®, UNIX®, LINUX®, or another known OS. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

Memory 725 may include random-access memory (RAM) and ROM. The memory 725 may store computer-readable, computer-executable software including instructions that, when executed, cause the processor 730 to perform various functions described herein. In some cases, the memory 725 may contain, among other things, a BIOS which may control basic hardware or software operation such as the interaction with peripheral components or devices.

The processor 730 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting caller process verification for device-bound authenticators).

The software platform 720 may support process verification at a first application of a device in accordance with examples as disclosed herein. For example, the software platform 720 may be configured to support receiving, from a second application of the device, a first request to establish a network connection between the first application and the second application, where the first request identifies a port associated with the network connection. The software platform 720 may be configured to support receiving, from the second application via the network connection, a second request to authenticate an identity of a user of the second application via the first application. The software platform 720 may be configured to support identifying, in response to the second request, a process used to establish the network connection between the first application and the second application based on the port. The software platform 720 may be configured to support obtaining a signature and a set of data associated with the signature based on the identified process, where authenticating the identity of the user is based on the signature and the associated set of data.

Additionally, or alternatively, the software platform 720 may support process verification at an authentication service of a first device in accordance with examples as disclosed herein. For example, the software platform 720 may be configured to support receiving, from a first application of a second device, a first request to authorize access to a resource by a user of the first application. The software platform 720 may be configured to support transmitting, to the first application in response to the first request, a second request to authenticate an identity of the user via a second application of the second device. The software platform 720 may be configured to support receiving, from the second application in response to the second request, a set of data associated with a signature of the first application, where authorizing access to the resource is based on the set of data.

By including or configuring the software platform 720 in accordance with examples as described herein, the device 705 may support techniques for improved communication reliability, reduced latency, improved user experience related to reduced processing, more efficient utilization of communication resources, and improved utilization of processing capability.

Figure 8:
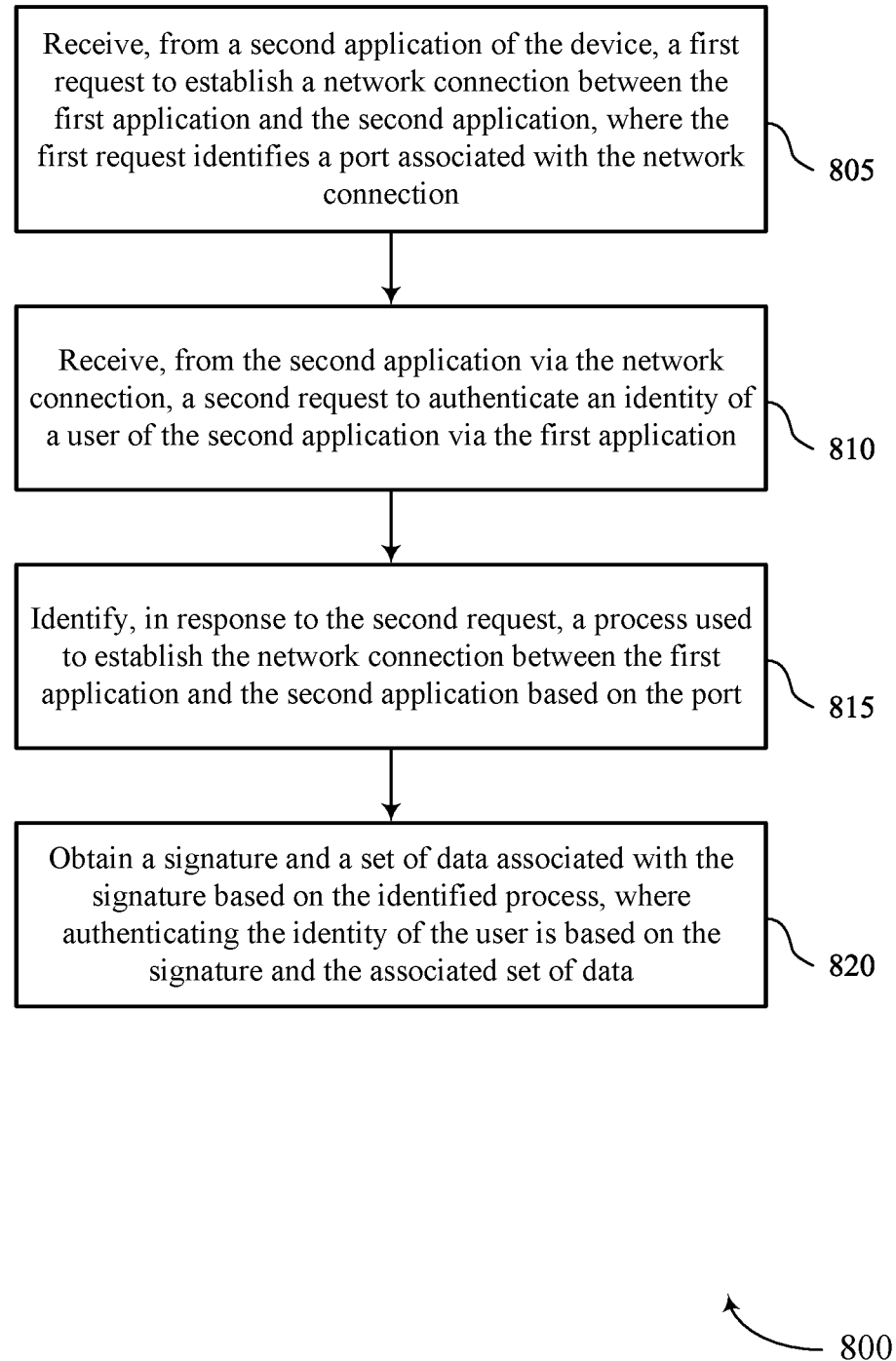
FIGS. 8 and 9 show flowcharts illustrating methods that support caller process verification for device-bound authenticators in accordance with aspects of the present disclosure.

FIG. 8 shows a flowchart illustrating a method 800 that supports caller process verification for device-bound authenticators in accordance with aspects of the present disclosure. The operations of the method 800 may be implemented by a device or its components as described herein. For example, the operations of the method 800 may be performed by a device as described with reference to FIGS. 1 through 7. In some examples, a device may execute a set of instructions to control the functional elements of the device the described functions. Additionally, or alternatively, the device may perform aspects of the described functions using special-purpose hardware.

At 805, the method may include receiving, from a second application of the device, a first request to establish a network connection between the first application and the second application, where the first request identifies a port associated with the network connection. The operations at 805 may be performed in accordance with examples as disclosed herein. In some examples, aspects of the operations at 805 may be performed by a network request component 625 as described with reference to FIG. 6.

At 810, the method may include receiving, from the second application via the network connection, a second request to authenticate an identity of a user of the second application via the first application. The operations at 810 may be performed in accordance with examples as disclosed herein. In some examples, aspects of the operations at 810 may be performed by an authentication request component 630 as described with reference to FIG. 6.

At 815, the method may include identifying, in response to the second request, a process used to establish the network connection between the first application and the second application based on the port. The operations at 815 may be performed in accordance with examples as disclosed herein. In some examples, aspects of the operations at 815 may be performed by a process identification component 635 as described with reference to FIG. 6.

At 820, the method may include obtaining a signature and a set of data associated with the signature based on the identified process, where authenticating the identity of the user is based on the signature and the associated set of data. The operations at 820 may be performed in accordance with examples as disclosed herein. In some examples, aspects of the operations at 820 may be performed by a signature data component 640 as described with reference to FIG. 6.

Figure 9:
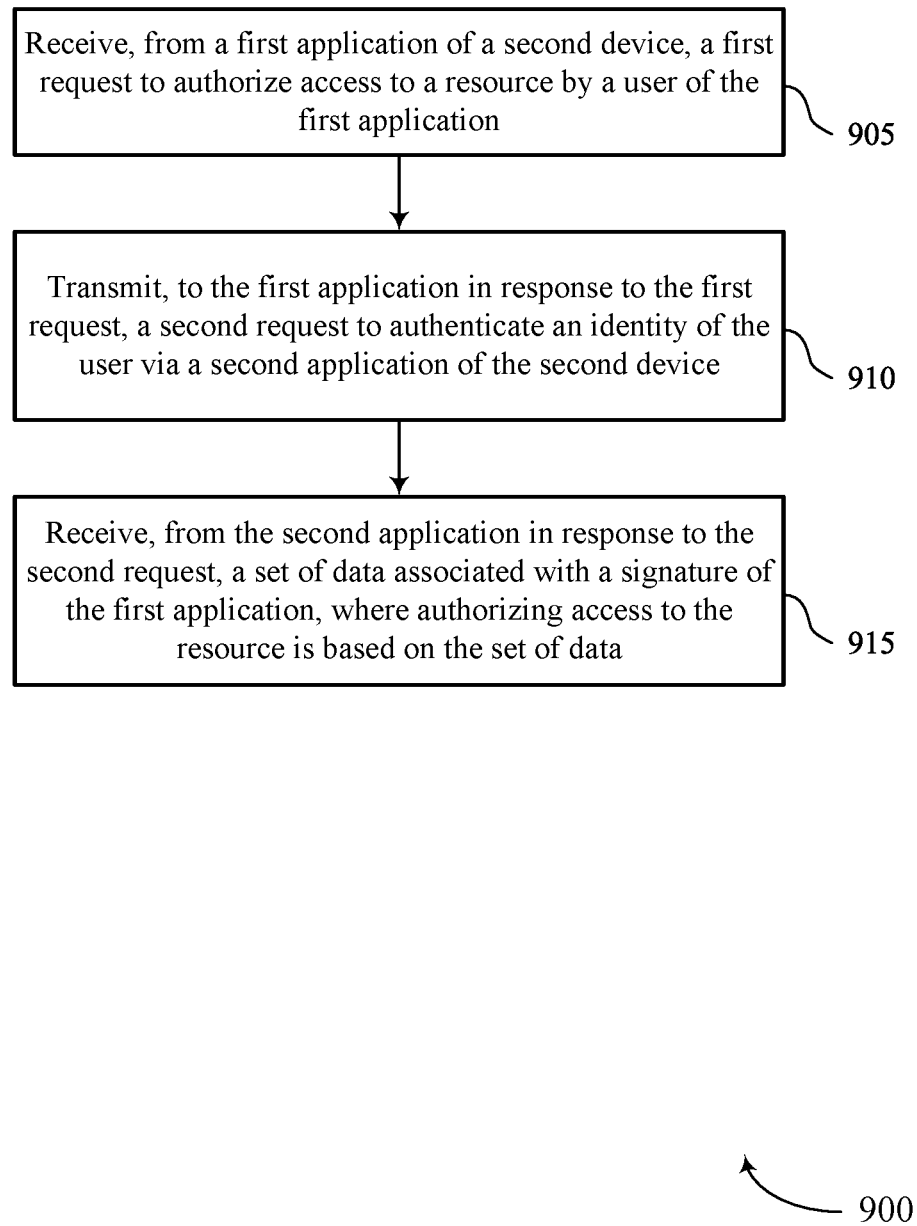

FIG. 9 shows a flowchart illustrating a method 900 that supports caller process verification for device-bound authenticators in accordance with aspects of the present disclosure. The operations of the method 900 may be implemented by a device or its components as described herein. For example, the operations of the method 900 may be performed by a device as described with reference to FIGS. 1 through 7. In some examples, a device may execute a set of instructions to control the functional elements of the device to perform the described functions. Additionally, or alternatively, the device may perform aspects of the described functions using special-purpose hardware.

At 905, the method may include receiving, from a first application of a second device, a first request to authorize access to a resource by a user of the first application. The operations at 905 may be performed in accordance with examples as disclosed herein. In some examples, aspects of the operations at 905 may be performed by an access request component 645 as described with reference to FIG. 6.

At 910, the method may include transmitting, to the first application in response to the first request, a second request to authenticate an identity of the user via a second application of the second device. The operations at 910 may be performed in accordance with examples as disclosed herein. In some examples, aspects of the operations at 910 may be performed by an authentication request component 630 as described with reference to FIG. 6.

At 915, the method may include receiving, from the second application in response to the second request, a set of data associated with a signature of the first application, where authorizing access to the resource is based on the set of data. The operations at 915 may be performed in accordance with examples as disclosed herein. In some examples, aspects of the operations at 915 may be performed by a signature data component 640 as described with reference to FIG. 6.

A method for process verification at a first application of a device is described. The method may include receiving, from a second application of the device, a first request to establish a network connection between the first application and the second application, where the first request identifies a port associated with the network connection, receiving, from the second application via the network connection, a second request to authenticate an identity of a user of the second application via the first application, identifying, in response to the second request, a process used to establish the network connection between the first application and the second application based on the port, and obtaining a signature and a set of data associated with the signature based on the identified process, where authenticating the identity of the user is based on the signature and the associated set of data.

An apparatus for process verification at a first application of a device is described. The apparatus may include a processor, memory coupled with the processor, and instructions stored in the memory. The instructions may be executable by the processor to cause the apparatus to receive, from a second application of the device, a first request to establish a network connection between the first application and the second application, where the first request identifies a port associated with the network connection, receive, from the second application via the network connection, a second request to authenticate an identity of a user of the second application via the first application, identify, in response to the second request, a process used to establish the network connection between the first application and the second application based on the port, and obtain a signature and a set of data associated with the signature based on the identified process, where authenticating the identity of the user is based on the signature and the associated set of data.

Another apparatus for process verification at a first application of a device is described. The apparatus may include means for receiving, from a second application of the device, a first request to establish a network connection between the first application and the second application, where the first request identifies a port associated with the network connection, means for receiving, from the second application via the network connection, a second request to authenticate an identity of a user of the second application via the first application, means for identifying, in response to the second request, a process used to establish the network connection between the first application and the second application based on the port, and means for obtaining a signature and a set of data associated with the signature based on the identified process, where authenticating the identity of the user is based on the signature and the associated set of data.

A non-transitory computer-readable medium storing code for process verification at a first application of a device is described. The code may include instructions executable by a processor to receive, from a second application of the device, a first request to establish a network connection between the first application and the second application, where the first request identifies a port associated with the network connection, receive, from the second application via the network connection, a second request to authenticate an identity of a user of the second application via the first application, identify, in response to the second request, a process used to establish the network connection between the first application and the second application based on the port, and obtain a signature and a set of data associated with the signature based on the identified process, where authenticating the identity of the user is based on the signature and the associated set of data.

Some examples of the method, apparatuses, and non-transitory computer-readable medium described herein may further include operations, features, means, or instructions for determining, based on the set of data, whether the second application may be authorized for requesting authentication of the identity of the user via the first application and authenticating the identity of the user based on the determination.

Some examples of the method, apparatuses, and non-transitory computer-readable medium described herein may further include operations, features, means, or instructions for identifying a source of the second application based on the set of data, where determining whether the second application may be authorized for requesting authentication of the identity of the user may be based on the identified source.

Some examples of the method, apparatuses, and non-transitory computer-readable medium described herein may further include operations, features, means, or instructions for determining a level of legitimacy of the second application based on the identified source, where determining whether the second application may be authorized for requesting authentication of the identity of the user may be based on the determined level of legitimacy.

Some examples of the method, apparatuses, and non-transitory computer-readable medium described herein may further include operations, features, means, or instructions for determining an association between the identified source and a set of authorized sources or a set of unauthorized sources, where determining whether the second application may be authorized for requesting authentication of the identity of the user may be based on the determined association.

Some examples of the method, apparatuses, and non-transitory computer-readable medium described herein may further include operations, features, means, or instructions for receiving an indication of a configuration for authenticating the identity of the user, where determining whether the second application may be authorized for requesting authentication of the identity of the user may be based on the configuration.

In some examples of the method, apparatuses, and non-transitory computer-readable medium described herein, receiving the second request may include operations, features, means, or instructions for receiving, from the second application via the network connection, a message including the indication of the configuration and an indication of the second request, where the second request includes an authentication challenge, and where the configuration and the authentication challenge originated from an authentication service associated with the user.

Some examples of the method, apparatuses, and non-transitory computer-readable medium described herein may further include operations, features, means, or instructions for verifying a signature of the message based on a public key associated with the authentication service, where use of the configuration to determine whether the second application may be authorized for requesting authentication of the identity of the user may be based on verifying the signature.

In some examples of the method, apparatuses, and non-transitory computer-readable medium described herein, the set of data includes one or more types of data and the one or more types of data may be based on the configuration.

Some examples of the method, apparatuses, and non-transitory computer-readable medium described herein may further include operations, features, means, or instructions for transmitting, to an authentication service associated with the user, a message including an indication of the set of data, where authenticating the identity of the user may be based on transmitting the message to the authentication service.

In some examples of the method, apparatuses, and non-transitory computer-readable medium described herein, the second request includes an authentication challenge originating from the authentication service and the message includes the indication of the set of data and a response to the authentication challenge.

In some examples of the method, apparatuses, and non-transitory computer-readable medium described herein, obtaining the set of data may include operations, features, means, or instructions for obtaining the set of data from an OS of the device, an authentication service associated with the user, or a third-party application, or any combination thereof.

In some examples of the method, apparatuses, and non-transitory computer-readable medium described herein, obtaining the set of data may include operations, features, means, or instructions for obtaining data indicative of a location of code associated with the second application, data indicative of a name of the second application, data indicative of a name of a file including the code associated with the second application, data indicative of a process identifier corresponding to the process, data indicative of a version associated with the second application, data indicative of a level of integrity associated with the signature, data indicative of a validation status associated with a certificate chain of the signature, data indicative of a distinguished name corresponding to the signature, data indicative of a key identifier corresponding to the signature, or any combination thereof.

A method for process verification at an authentication service of a first device is described. The method may include receiving, from a first application of a second device, a first request to authorize access to a resource by a user of the first application, transmitting, to the first application in response to the first request, a second request to authenticate an identity of the user via a second application of the second device, and receiving, from the second application in response to the second request, a set of data associated with a signature of the first application, where authorizing access to the resource is based on the set of data.

An apparatus for process verification at an authentication service of a first device is described. The apparatus may include a processor, memory coupled with the processor, and instructions stored in the memory. The instructions may be executable by the processor to cause the apparatus to receive, from a first application of a second device, a first request to authorize access to a resource by a user of the first application, transmit, to the first application in response to the first request, a second request to authenticate an identity of the user via a second application of the second device, and receive, from the second application in response to the second request, a set of data associated with a signature of the first application, where authorizing access to the resource is based on the set of data.

Another apparatus for process verification at an authentication service of a first device is described. The apparatus may include means for receiving, from a first application of a second device, a first request to authorize access to a resource by a user of the first application, means for transmitting, to the first application in response to the first request, a second request to authenticate an identity of the user via a second application of the second device, and means for receiving, from the second application in response to the second request, a set of data associated with a signature of the first application, where authorizing access to the resource is based on the set of data.

A non-transitory computer-readable medium storing code for process verification at an authentication service of a first device is described. The code may include instructions executable by a processor to receive, from a first application of a second device, a first request to authorize access to a resource by a user of the first application, transmit, to the first application in response to the first request, a second request to authenticate an identity of the user via a second application of the second device, and receive, from the second application in response to the second request, a set of data associated with a signature of the first application, where authorizing access to the resource is based on the set of data.

Some examples of the method, apparatuses, and non-transitory computer-readable medium described herein may further include operations, features, means, or instructions for determining, based on the set of data, whether the first application may be authorized for requesting authentication of the identity of the user via the second application and authorizing access to the resource based on the determination.

Some examples of the method, apparatuses, and non-transitory computer-readable medium described herein may further include operations, features, means, or instructions for determining a configuration for authenticating the identity of the user, where determining whether the first application may be authorized for requesting authentication of the identity of the user via the second application may be based on the configuration.

Some examples of the method, apparatuses, and non-transitory computer-readable medium described herein may further include operations, features, means, or instructions for receiving, from a third device associated with an organization of the user, a message including an indication of the configuration or one or more parameters associated with the configuration, where determining the configuration may be based on the message.

Some examples of the method, apparatuses, and non-transitory computer-readable medium described herein may further include operations, features, means, or instructions for transmitting, to the third device, a recommendation for the configuration based on historical access request associated with the first application, where the indication of the configuration may be based on the recommendation.

Some examples of the method, apparatuses, and non-transitory computer-readable medium described herein may further include operations, features, means, or instructions for storing data associated with the first request, where the stored data includes the set of data or data indicative of an action performed by the first application in response to authorizing access to the resource, or both.

In some examples of the method, apparatuses, and non-transitory computer-readable medium described herein, the set of data includes one or more types of data and the one or more types of data may be based on the configuration.

Some examples of the method, apparatuses, and non-transitory computer-readable medium described herein may further include operations, features, means, or instructions for identifying a source of the first application based on the set of data, where determining whether the first application may be authorized for requesting authentication of the identity of the user may be based on the identified source.

Some examples of the method, apparatuses, and non-transitory computer-readable medium described herein may further include operations, features, means, or instructions for determining a level of legitimacy of the first application based on the identified source, where determining whether the first application may be authorized for requesting authentication of the identity of the user may be based on the determined level of legitimacy.

Some examples of the method, apparatuses, and non-transitory computer-readable medium described herein may further include operations, features, means, or instructions for determining an association between the identified source and a set of authorized sources or a set of unauthorized sources, where determining whether the first application may be authorized for requesting authentication of the identity of the user may be based on the determined association.

In some examples of the method, apparatuses, and non-transitory computer-readable medium described herein, the second request includes an authentication challenge.

In some examples of the method, apparatuses, and non-transitory computer-readable medium described herein, the set of data may be obtained from an OS of the second device, the authentication service, or a third-party application, or any combination thereof.

In some examples of the method, apparatuses, and non-transitory computer-readable medium described herein, the set of data includes data indicative of a location of code associated with the first application, data indicative of a name of the first application, data indicative of a name of a file including the code associated with the first application, data indicative of a process used to establish a network connection between the first application and the second application, data indicative of a version associated with the first application, data indicative of a level of integrity associated with the signature, data indicative of a validation status associated with a certificate chain of the signature, data indicative of a distinguished name corresponding to the signature, data indicative of a key identifier corresponding to the signature, or any combination thereof.

The following provides an overview of aspects of the present disclosure:

Aspect 1: A method for process verification at a first application of a device, comprising: receiving, from a second application of the device, a first request to establish a network connection between the first application and the second application, wherein the first request identifies a port associated with the network connection; receiving, from the second application via the network connection, a second request to authenticate an identity of a user of the second application via the first application; identifying, in response to the second request, a process used to establish the network connection between the first application and the second application based at least in part on the port; and obtaining a signature and a set of data associated with the signature based at least in part on the identified process, wherein authenticating the identity of the user is based at least in part on the signature and the associated set of data.

Aspect 2: The method of aspect 1, further comprising: determining, based at least in part on the set of data, whether the second application is authorized for requesting authentication of the identity of the user via the first application; and authenticating the identity of the user based at least in part on the determination.

Aspect 3: The method of aspect 2, further comprising: identifying a source of the second application based at least in part on the set of data, wherein determining whether the second application is authorized for requesting authentication of the identity of the user is based at least in part on the identified source.

Aspect 4: The method of aspect 3, further comprising: determining a level of legitimacy of the second application based at least in part on the identified source, wherein determining whether the second application is authorized for requesting authentication of the identity of the user is based at least in part on the determined level of legitimacy.

Aspect 5: The method of any of aspects 3 through 4, further comprising: determining an association between the identified source and a set of authorized sources or a set of unauthorized sources, wherein determining whether the second application is authorized for requesting authentication of the identity of the user is based at least in part on the determined association.

Aspect 6: The method of any of aspects 2 through 5, further comprising: receiving an indication of a configuration for authenticating the identity of the user, wherein determining whether the second application is authorized for requesting authentication of the identity of the user is based at least in part on the configuration.

Aspect 7: The method of aspect 6, wherein receiving the second request comprises: receiving, from the second application via the network connection, a message comprising the indication of the configuration and an indication of the second request, wherein the second request comprises an authentication challenge, and wherein the configuration and the authentication challenge originated from an authentication service associated with the user.

Aspect 8: The method of aspect 7, further comprising: verifying a signature of the message based at least in part on a public key associated with the authentication service, wherein use of the configuration to determine whether the second application is authorized for requesting authentication of the identity of the user is based at least in part on verifying the signature.

Aspect 9: The method of any of aspects 6 through 8, wherein the set of data comprises one or more types of data, and the one or more types of data are based at least in part on the configuration.

Aspect 10: The method of any of aspects 1 through 9, further comprising: transmitting, to an authentication service associated with the user, a message comprising an indication of the set of data, wherein authenticating the identity of the user is based at least in part on transmitting the message to the authentication service.

Aspect 11: The method of aspect 10, wherein the second request comprises an authentication challenge originating from the authentication service, and the message comprises the indication of the set of data and a response to the authentication challenge.

Aspect 12: The method of any of aspects 1 through 11, wherein obtaining the set of data comprises: obtaining the set of data from an OS of the device, an authentication service associated with the user, or a third-party application, or any combination thereof.

Aspect 13: The method of any of aspects 1 through 12, wherein obtaining the set of data comprises: obtaining data indicative of a location of code associated with the second application, data indicative of a name of the second application, data indicative of a name of a file comprising the code associated with the second application, data indicative of a process identifier corresponding to the process, data indicative of a version associated with the second application, data indicative of a level of integrity associated with the signature, data indicative of a validation status associated with a certificate chain of the signature, data indicative of a distinguished name corresponding to the signature, data indicative of a key identifier corresponding to the signature, or any combination thereof.

Aspect 14: A method for process verification at an authentication service of a first device, comprising: receiving, from a first application of a second device, a first request to authorize access to a resource by a user of the first application; transmitting, to the first application in response to the first request, a second request to authenticate an identity of the user via a second application of the second device; and receiving, from the second application in response to the second request, a set of data associated with a signature of the first application, wherein authorizing access to the resource is based at least in part on the set of data.

Aspect 15: The method of aspect 14, further comprising: determining, based at least in part on the set of data, whether the first application is authorized for requesting authentication of the identity of the user via the second application; and authorizing access to the resource based at least in part on the determination.

Aspect 16: The method of aspect 15, further comprising: determining a configuration for authenticating the identity of the user, wherein determining whether the first application is authorized for requesting authentication of the identity of the user via the second application is based at least in part on the configuration.

Aspect 17: The method of aspect 16, further comprising: receiving, from a third device associated with an organization of the user, a message comprising an indication of the configuration or one or more parameters associated with the configuration, wherein determining the configuration is based at least in part on the message.

Aspect 18: The method of aspect 17, further comprising: transmitting, to the third device, a recommendation for the configuration based at least in part on historical access request associated with the first application, wherein the indication of the configuration is based at least in part on the recommendation.

Aspect 19: The method of any of aspects 16 through 18, further comprising: storing data associated with the first request, wherein the stored data comprises the set of data or data indicative of an action performed by the first application in response to authorizing access to the resource, or both.

Aspect 20: The method of any of aspects 16 through 19, wherein the set of data comprises one or more types of data, and the one or more types of data are based at least in part on the configuration.

Aspect 21: The method of any of aspects 15 through 20, further comprising: identifying a source of the first application based at least in part on the set of data, wherein determining whether the first application is authorized for requesting authentication of the identity of the user is based at least in part on the identified source.

Aspect 22: The method of aspect 21, further comprising: determining a level of legitimacy of the first application based at least in part on the identified source, wherein determining whether the first application is authorized for requesting authentication of the identity of the user is based at least in part on the determined level of legitimacy.

Aspect 23: The method of any of aspects 21 through 22, further comprising: determining an association between the identified source and a set of authorized sources or a set of unauthorized sources, wherein determining whether the first application is authorized for requesting authentication of the identity of the user is based at least in part on the determined association.

Aspect 24: The method of any of aspects 14 through 23, wherein the second request comprises an authentication challenge.

Aspect 25: The method of any of aspects 14 through 24, wherein the set of data is obtained from an OS of the second device, the authentication service, or a third-party application, or any combination thereof.

Aspect 26: The method of any of aspects 14 through 25, wherein the set of data comprises data indicative of a location of code associated with the first application, data indicative of a name of the first application, data indicative of a name of a file comprising the code associated with the first application, data indicative of a process used to establish a network connection between the first application and the second application, data indicative of a version associated with the first application, data indicative of a level of integrity associated with the signature, data indicative of a validation status associated with a certificate chain of the signature, data indicative of a distinguished name corresponding to the signature, data indicative of a key identifier corresponding to the signature, or any combination thereof.

Aspect 27: An apparatus for process verification at a first application of a device, comprising a processor; memory coupled with the processor; and instructions stored in the memory and executable by the processor to cause the apparatus to perform a method of any of aspects 1 through 13.

Aspect 28: An apparatus for process verification at a first application of a device, comprising at least one means for performing a method of any of aspects 1 through 13.

Aspect 29: A non-transitory computer-readable medium storing code for process verification at a first application of a device, the code comprising instructions executable by a processor to perform a method of any of aspects 1 through 13.

Aspect 30: An apparatus for process verification at an authentication service of a first device, comprising a processor; memory coupled with the processor; and instructions stored in the memory and executable by the processor to cause the apparatus to perform a method of any of aspects 14 through 26.

Aspect 31: An apparatus for process verification at an authentication service of a first device, comprising at least one means for performing a method of any of aspects 14 through 26.

Aspect 32: A non-transitory computer-readable medium storing code for process verification at an authentication service of a first device, the code comprising instructions executable by a processor to perform a method of any of aspects 14 through 26.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for process verification at a first application of a device, comprising:
   receiving, from a second application of the device, a first request to establish a network connection between the first application and the second application, wherein the first request identifies a port associated with the network connection;
   receiving, from the second application via the network connection, a second request to authenticate an identity of a user of the second application via the first application;
   identifying, in response to the second request, a process used to establish the network connection between the first application and the second application based at least in part on the port; and
   obtaining a signature and a set of data associated with the signature based at least in part on the identified process, wherein authenticating the identity of the user is based at least in part on the signature and the associated set of data.

2. The method of claim 1, further comprising:
   determining, based at least in part on the set of data, whether the second application is authorized for requesting authentication of the identity of the user via the first application; and
   authenticating the identity of the user based at least in part on the determination.

3. The method of claim 2, further comprising:
   identifying a source of the second application based at least in part on the set of data, wherein determining whether the second application is authorized for requesting the authentication of the identity of the user is based at least in part on the identified source.

4. The method of claim 3, further comprising:
   determining a level of legitimacy of the second application based at least in part on the identified source, wherein determining whether the second application is authorized for requesting the authentication of the identity of the user is based at least in part on the determined level of legitimacy.

5. The method of claim 3, further comprising:
   determining an association between the identified source and a set of authorized sources or a set of unauthorized sources, wherein determining whether the second application is authorized for requesting the authentication of the identity of the user is based at least in part on the determined association.

6. The method of claim 2, further comprising:
receiving an indication of a configuration for authenticating the identity of the user, wherein determining whether the second application is authorized for requesting the authentication of the identity of the user is based at least in part on the configuration.

7. The method of claim 6, wherein receiving the second request comprises:
receiving, from the second application via the network connection, a message comprising the indication of the configuration and an indication of the second request, wherein the second request comprises an authentication challenge, and wherein the configuration and the authentication challenge originated from an authentication service associated with the user.

8. The method of claim 7, further comprising:
verifying a second signature of the message based at least in part on a public key associated with the authentication service, wherein use of the configuration to determine whether the second application is authorized for requesting the authentication of the identity of the user is based at least in part on verifying the second signature.

9. The method of claim 6, wherein the set of data comprises one or more types of data, and wherein the one or more types of data are based at least in part on the configuration.

10. The method of claim 1, further comprising:
transmitting, to an authentication service associated with the user, a message comprising an indication of the set of data, wherein authenticating the identity of the user is based at least in part on transmitting the message to the authentication service.

11. The method of claim 10, wherein the second request comprises an authentication challenge originating from the authentication service, and wherein the message comprises the indication of the set of data and a response to the authentication challenge.

12. The method of claim 1, wherein obtaining the set of data comprises:
obtaining the set of data from an operating system of the device, an authentication service associated with the user, or a third-party application, or any combination thereof.

13. The method of claim 1, wherein obtaining the set of data comprises:
obtaining data indicative of a location of code associated with the second application, data indicative of a name of the second application, data indicative of a name of a file comprising the code associated with the second application, data indicative of a process identifier corresponding to the process, data indicative of a version associated with the second application, data indicative of a level of integrity associated with the signature, data indicative of a validation status associated with a certificate chain of the signature, data indicative of a distinguished name corresponding to the signature, data indicative of a key identifier corresponding to the signature, or any combination thereof.

14. An apparatus for process verification at a first application of a device, comprising:
one or more processors;
one or more memories coupled with the one or more processors; and
instructions stored in the one or more memories and executable by the one or more processors to cause the apparatus to:
receive, from a second application of the device, a first request to establish a network connection between the first application and the second application, wherein the first request identifies a port associated with the network connection;
receive, from the second application via the network connection, a second request to authenticate an identity of a user of the second application via the first application;
identify, in response to the second request, a process used to establish the network connection between the first application and the second application based at least in part on the port; and
obtain a signature and a set of data associated with the signature based at least in part on the identified process, wherein authenticating the identity of the user is based at least in part on the signature and the associated set of data.

* * * * *